(12) United States Patent
Argenti

(10) Patent No.: US 11,397,823 B1
(45) Date of Patent: Jul. 26, 2022

(54) REMOTE HARDWARE ACCESS SERVICE

(71) Applicant: Amazon Technologies, Inc., Seattle, WA (US)

(72) Inventor: Marco Argenti, Mercer Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 485 days.

(21) Appl. No.: 16/453,921

(22) Filed: Jun. 26, 2019

(51) Int. Cl.
G06F 21/62 (2013.01)
H04L 9/32 (2006.01)
G06Q 30/00 (2012.01)

(52) U.S. Cl.
CPC ......... G06F 21/6218 (2013.01); G06Q 30/01 (2013.01); H04L 9/3263 (2013.01)

(58) Field of Classification Search
CPC . G06F 21/6218; H04L 9/3263; H04L 9/0877; H04L 63/0876
USPC .......................................................... 726/17
See application file for complete search history.

(56) References Cited

U.S. PATENT DOCUMENTS

| 9,280,653 B2 | 3/2016 | Forest |
| 9,854,442 B2 | 12/2017 | Mazzara, Jr. |
| 2002/0173289 A1* | 11/2002 | Pacsai ............... H04W 52/0229 455/343.1 |
| 2002/0197976 A1* | 12/2002 | Liu ....................... B60R 16/037 455/352 |
| 2004/0003243 A1* | 1/2004 | Fehr ....................... B62D 65/00 713/168 |
| 2016/0099806 A1 | 4/2016 | Racklyeft et al. |
| 2016/0330032 A1 | 11/2016 | Naim et al. |
| 2016/0350735 A1* | 12/2016 | Russell ............... G06Q 20/3276 |
| 2018/0290628 A1* | 10/2018 | Luke ..................... B60R 25/209 |

OTHER PUBLICATIONS

Lili Zhang et al., "A DRM System Based on PKI", 2010 Fourth International Conference on Genetic and Evolutionary Computing, IEEE, 2010, pp. 522-525.
Mattias Ohrn, "Publice Key Infrastructure Utilisation in Digital Rights Management", KTH Numerical Analysis and Computer Science, 2004, pp. 1-84.

* cited by examiner

Primary Examiner — Teshome Hailu
(74) Attorney, Agent, or Firm — Robert C. Kowert; Kowert, Hood, Munyon, Rankin & Goetzel, P.C.

(57) ABSTRACT

A system comprising one or more computers implements a hardware feature access service. The hardware feature access service stores private keys that correspond to digital certificates embedded in chipsets of devices enrolled in the hardware feature access service. The hardware feature access service is configured to issue access or access revocation messages to the chipsets to "lock" or "unlock" associated hardware components. The hardware feature access service also implements a service interface that allows clients to request changes to enabled feature sets for devices enrolled in the hardware feature access service. In response to such requests, the hardware feature service automatically and wirelessly enables or disables feature sets by locking or unlocking relevant hardware components of a device relevant to enabling or disabling the requested feature sets.

20 Claims, 15 Drawing Sheets

REMOTE HARDWARE ACCESS SERVICE

BACKGROUND

In order to take advantage of efficiencies associated with standardization, and for various other reasons, many device producers, such as vehicle manufacturers, consumer electronics manufactures, etc. manufacture devices using common standardized hardware platforms. In order to differentiate between models of a given type of device, the producers often enable or disable features for the given type of device in software. Thus, such devices often include hardware capable of performing additional features, but such devices are not enabled to perform the additional features because the additional features have not been enabled via software loaded onto the devices. Such devices are susceptible to illicit uses of the additional features. For example, if a user of a device is able to obtain an unauthorized version of software for the device that enables the additional features, the user may be able to enable the additional features on a device for which the additional features have not been purchased.

Also, many device producers sell devices with feature sets that are configured prior to or at the time of initial purchase of the devices. Subsequent users of such a device are then limited to whatever feature set was selected by the initial purchaser. For example, a vehicle may be sold with a particular feature set that is pre-configured at or before the time the vehicle was initially purchased. A subsequent owner or user of the vehicle is then limited to the feature set selected by the initial purchaser.

Additionally, to the extent feature sets of a given device can be changed, the process of changing the device feature sets typically involves physically taking the given device into a service center, such as an authorized dealership, and waiting at the service center while technicians re-configure the device.

Figure 1:
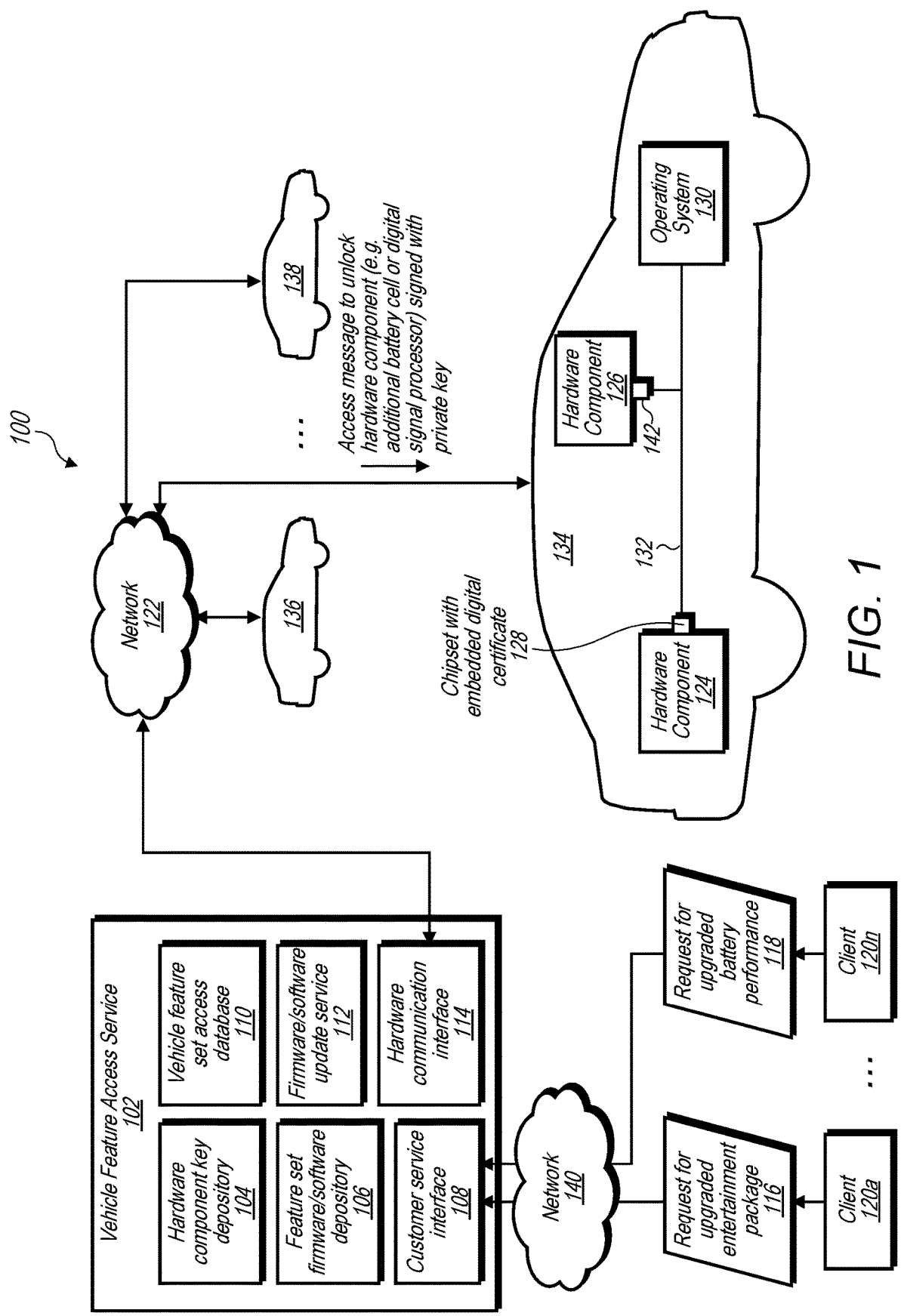
FIG. 1 illustrates a vehicle feature access service that receives requests for vehicle feature sets from clients of the vehicle feature access service and that remotely causes hardware components to be enabled on respective vehicles of a fleet of vehicles enrolled in the vehicle feature access service to enable requested vehicle feature sets, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for implementing a hardware feature access service that enables clients of the hardware feature access service to request additional features be enabled for a device enrolled in the hardware feature access service, wherein in response to the request being approved, the hardware feature access service remotely unlocks one or more hardware components in the device. In some embodiments, the hardware components each include a chipset with a digital certificate physically embedded in at least one of the chips of the chipset at the time of manufacture of the chipset. The chipset is configured to prevent locking or unlocking of the chipset's associated hardware component without being provided an access key corresponding to the digital certificate embedded in the at least one chip of the chipset. In some embodiments, the devices enrolled in the hardware feature access service may include vehicles. In some embodiments, a hardware feature access service that supports enrolled vehicles may be referred to herein as a vehicle feature access service. In some embodiments, a hardware feature access service may support other types of devices, such as other types of consumer electronics, such as mobile devices, televisions, computer systems, tablets, projectors, cameras, microphones etc. In some embodiments, a hardware feature access service may control access to groups of devices. For example, a hardware feature access service may control access to devices included in shared spaces or resources, such as a shared conference room, wherein a client indicates, or is offered, a set of devices to be enabled while using the shared space. In some embodiments, digital certificates may be loaded into chipsets included in hardware components subsequent to the time of manufacture of the chipsets. For example in some embodiments, a digital certificate may be generated from a private key in the possession of an operator of a hardware feature access service, and the digital certificate may be loaded into a chipset of a hardware component to be added to the hardware feature access service as part of a process of enrolling the hardware component in the hardware feature access service. In some embodiments, physically embedding a digital certificate in a chipset at the time of manufacture of the chipset may reduce risks of the digital certificate being comprised. In some embodiments, loading a digital certificate into a chipset subsequent to manufacture may provider greater flexibility to add hardware components to a hardware feature access service, but may require proper procedure to ensure the digital certificate is not intercepted or otherwise comprised.

In some embodiments, a system for implementing a hardware feature access service, such as a vehicle feature access service, includes a hardware key depository, a hardware component communication interface, and a service interface. In some embodiments, one or more computing devices, such as a computer or set of computers of a distributed system, store program instructions that, when executed by one or more processors, cause the one or more processors to implement the hardware key depository, the hardware component communication interface, and the service interface. In some embodiments, one or more memories or other storage devices implement the hardware key depository. The hardware key depository stores data that corresponds to respective digital certificates physically embedded in at least one chip of respective chipsets associated with hardware components included in one or more vehicles enrolled in the vehicle feature access service, wherein the digital certificates are physically embedded in the respective chips of the chipsets associated with the hardware components at the time of manufacture of the chipsets. Also, the chipsets of the hardware components are configured to prevent locking or unlocking of the respective chipset's associated hardware component without being provided an access key corresponding to the digital certificate embedded in the at least one chip of the respective chipset. In addition, the hardware component communication interface is configured to establish a wireless connection to a particular vehicle of the one or more vehicles enrolled in the vehicle feature access service and issue one or more access messages to one or more chipsets of one or more hardware components of the particular vehicle to unlock the one or more of the hardware components of the particular vehicle, wherein the one or more access messages are signed using the data corresponding to the digital certificates physically embedded in the respective one or more chipsets of the one or more hardware components. In addition, the service interface is configured to receive a request from a client of the vehicle feature access service to provide a vehicle feature set for a given vehicle enrolled in the vehicle feature access service, verify the client is entitled to be provided the requested vehicle feature set for the given vehicle, and cause the hardware component communication interface to remotely issue one or more access messages to one or more chipsets of one or more relevant hardware components associated with the requested vehicle feature set to unlock the relevant one or more hardware components and enable the requested vehicle feature set for the given vehicle.

In some embodiments, a hardware feature access service includes a hardware key depository storing data that corresponds to respective digital certificates physically embedded in respective chips of hardware components included in devices enrolled in the hardware feature access service, wherein the digital certificates are physically embedded in the respective chips of the hardware components at the time of manufacture of the chips, and wherein each chip is configured to prevent locking or unlocking of the chip's associated hardware component without being provided an access key corresponding to the digital certificate embedded in the respective chip. Also, in some embodiments, the hardware key depository may store data that corresponds to respective digital certificates loaded into chipsets of devices enrolled in the hardware feature access service subsequent to manufacture of the chipsets and/or devices. The hardware feature access service also includes one or more computing devices storing program instructions, that when executed by one or more processors, implement a hardware component communication interface configured to remotely issue access messages to hardware components of devices enrolled in the hardware feature access service to unlock the hardware components, wherein the access messages are signed using the data corresponding to the digital certificates physically embedded, or otherwise loaded, in the respective chips of the hardware components. Moreover, the hardware feature access service includes one or more computing devices storing program instructions, that when executed by one or more processors, implement a service interface. The service interface is configured to receive a request from a client of the hardware feature access service to provide a device feature set for a given device enrolled in the hardware feature access service and cause the hardware component communication interface to remotely issue one or more access messages to one or more chipsets of one or more relevant hardware components associated with the device feature set to unlock the one or more relevant hardware components and enable the device feature set.

In some embodiments, a method includes storing, by a hardware feature access service, private keys corresponding to digital certificates physically embedded, or otherwise loaded, in respective chipsets of hardware components included in devices enrolled in the hardware feature access service, wherein each chipset is configured to prevent locking or unlocking of the respective chipset's associated hardware component without being provided an access key generated from one of the respective private keys corresponding to the digital certificate embedded in the respective chipset. The method also includes receiving, at the hardware feature access service, a request from a client of the hardware feature access service to provide a device feature set for a given device enrolled in the hardware feature access service. In addition, the method includes remotely issuing one or more access messages to one or more chipsets of relevant hardware components associated with the requested device feature set to unlock the relevant hardware components and enable the device feature set in the given device enrolled in the hardware feature access service.

In order to streamline the manufacturing process, many producers of devices such as consumer electronic device producers, vehicle manufacturers, etc. produce various models of devices using a similar, or the same, hardware platform. In order to differentiate between different models that are built using the same hardware platform, the producers selectively enable features for different modules via software. For example, several models of a vehicle may be manufactured to include a given hardware component, such as side cameras or other sensors capable of performing a "lane assist" feature, but a base model or lower grade model may not be equipped with software to enable certain features associated with the given hardware component, such as the "lane assist" feature. A user of such a device, such as the vehicle, may be required to purchase a premium model in order to have additional features enabled on the device, wherein the premium model includes software that enables the given hardware component, such as the side camera or other sensor, to be used in performing the certain feature, such as the "lane assist" feature. However, such producers are susceptible to foregoing sales for such additional features due to illicit software that enables the additional features, such as the "lane assist" feature, without the producer being compensated for the additional features. For example, a customer may obtain an unauthorized version of software for a vehicle to enable the "lane assist" feature without paying the producer or dealer for the "lane assist" feature.

Also, since device features are typically configured at the point of manufacture, such as in the factory, a purchaser of a used-device, such as a pre-owned vehicle, is often limited to a set of features that were configured for the device at the time of manufacture or initial purchase of the device. Moreover, in a shared device environment, users of devices in the shared device environment may have varying needs for different feature sets for the shared devices. For example, in a scenario where a vehicle is shared by multiple drivers, some drivers may require or prefer feature sets that differ from feature sets required or preferred by other drivers. In such a shared device environment, device users are often required to purchase features they don't need or prefer, or the device users are not provided with features they need or prefer. For example, rental cars, or car sharing services, often come with pre-configured features such that a user of a rental car is required to select a model to rent from a group of models with pre-configured feature sets that may or may not correspond to feature sets the user requires or prefers. As a specific example, a premium model rental car may come with a "lane assist" feature and an enhanced stereo system. The renter may require or prefer the "lane assist" feature but not require or prefer the enhanced stereo system. However, since the rental cars come with pre-configured feature sets, the renter is limited to either paying extra for the enhanced stereo system that the renter does not need or prefer, or foregoing the "lane assist" feature that the renter does need or prefer, in order to avoid paying for the unneeded enhanced stereo system. A similar dynamic plays out with pre-owned devices, such as pre-owned vehicles, wherein a purchaser of a pre-owned device is limited to feature sets selected by the initial purchaser of the device.

In some embodiments, in order to provide clients access to device feature sets particularly tailored to the client's needs and preferences and to prevent illicit uses of device features, a hardware feature access service may remotely control access to hardware features of devices enrolled in the hardware feature access service. In order to avoid illicit uses of device features, physical hardware components of the devices enrolled in the hardware feature access service, such as a side camera or sensor for use in "lane assist", may be configured with an associated chipset that locks or unlocks the associated hardware component in response to access messages or revocation message received from the hardware feature access service. In some embodiments, the associated chipsets may include at least one chip that includes a digital certificate hard coded into the at least one chip of the chipset. The digital certificate may be used by the chipset to verify the authenticity of a received access message or revocation message before acting on the received access message or revocation message to lock or unlock an associated hardware component. For example, in some embodiments, the digital certificate may be generated using asymmetrical encryption and may be based on a private key known only to the chipset manufacturer that is then provided to the hardware feature access service. In some embodiments, the hardware feature access service may digitally sign an access message or a revocation message directed to the particular chipset with a digital signature also generated from the private key for the chipset that is known only by the hardware feature access service (and possibly the manufacturer of the chipset).

In some embodiments, any messages received by a chipset not signed using a private key corresponding to a digital certificate embedded in the chipset may be rejected by the chipset as an inauthentic message. Additionally, in some embodiments, the chipset may be encased in a tamper proof, tamper-resistant, or tamper-respondent casing that prevents unauthorized access to the chipset. Thus, attempts to alter the digital certificate embedded in the chipset may result in the chipset and associated hardware component defaulting to a locked status. In this way, even if illicit software for the device is obtained, feature sets that require locked hardware components to be unlocked would not be enabled because an operating system executing the software would not be able to communicate with the locked hardware components.

In some embodiments, in order to provide customized feature sets to clients of a hardware feature access service, the hardware feature access service may allow a client to acquire or release feature sets for a given device, such as a vehicle, at any point during the life of the device. For example, at the time of purchase of a device, such as vehicle, a customer may be sensitive to spending additional money for additional feature sets for the device and therefore may forego purchasing the additional feature sets. However, after owning the device for some amount of time, the customer may be interested in using the additional features on a trial basis or permanently. In such situations, in some embodiments, the customer may submit a request to a hardware feature access service to upgrade a feature set for the already purchased device via a user interface, such as a web-based graphical user interface (GUI) to the hardware feature access service. In response to the request and in response to verifying that the customer is entitled to access the additional feature sets, the hardware feature access service may automatically and wirelessly "unlock" relevant hardware components in the device to enable the additional feature set.

In some embodiments, in the case of a shared device environment, a hardware feature access service may enable/disable feature sets by "locking" or "unlocking" relevant hardware components of a device on a customer specific basis. For example, in the context of a shared space or resource, such as a shared conference room, a first client may request to enable a projector in the shared space, and later in the same day, a second client may request to enable a microphone and camera for video conferencing. In both situations, the first client may only be required to pay for access to the projector and the second client may only be required to pay for access to the microphone and camera for video conferencing. In such a scenario, a hardware feature access service may unlock the projector for the first client while leaving the microphone and camera for video conferencing locked. Also, the hardware feature access service may unlock the microphone and the camera for video conferencing for the second client while leaving the projector locked. In this way, the different users of the shared space may only be provided access to particular devices or device features needed or preferred by the different users without having to pay for devices or device features not needed or preferred by the different users. As can be seen, in some embodiments, a client of a hardware feature access service may be provided access to all or a subset of devices of shared resource, such as access to all devices in a shared conference room, or a subset of a larger set of devices included in the shared conference room.

FIG. 1 illustrates a vehicle feature access service that receives requests for vehicle feature sets from clients of the vehicle feature access service and that remotely causes hardware components to be enabled on respective vehicles of a fleet of vehicles enrolled in the vehicle feature access service to enable requested vehicle feature sets, according to some embodiments.

In some embodiments, a system for a hardware feature access service or a vehicle feature access service, such as system 100, includes a hardware (or vehicle) feature access service system, one or more networks, and a fleet of devices, such as vehicles or other types of devices. For example, system 100 includes vehicle feature access service system 102 connected to clients 120A thru 120N via network 140 and also connected to a fleet of vehicles, such as vehicles 134, 136, and 138, via network 122. In some embodiments, a common network may connect the vehicle feature access service 102 to clients 120A thru 120N and to vehicles 134, 136, and 138. For example, network 140 and network 122 may be a common network, or in other embodiments, a separate network may be used to connect the vehicle feature access service 102 to vehicles 134, 136, and 138. In some embodiments, any number of devices, such as vehicles 134, 136, and 138 or other devices, may be connected to a hardware feature access service, such as vehicle feature access service 102. In some embodiments, a hardware feature access service may support multiple different types of enrolled devices, such as vehicles, electronic equipment in a shared space, etc.

In some embodiments, a hardware feature access service, such as vehicle feature access service 102, may include a hardware component key depository, a device feature set access database, a hardware communication interface, a customer service interface, a feature set firmware/software depository, and/or a firmware/software update service. For example, vehicle feature access service 102 includes hardware component key depository 104, feature set firmware/software depository 106, customer service interface 108, vehicle feature access database 110, firmware/software update service 112, and hardware communication interface 114.

Also, in some embodiments, a device enrolled in a hardware feature access service, such as vehicle feature access service 102, includes one or more chipsets each with a unique embedded digital certificate, wherein the respective chipsets are associated with respective hardware components of the device enrolled in the hardware feature access service, and wherein the hardware feature access service locks or unlocks the respective hardware components via messages sent to the respective chipsets. In some embodiments, the messages sent to the respective chipsets are signed with a digital signature generated based on a private key corresponding to the respective digital certificates embedded in the respective chipsets. For example, a given chipset may by default be "locked" and may change status to "unlocked" in response to receiving an access message from a hardware feature access service. In order to prevent unauthorized access messages, the hardware feature access service may sign an access message directed to a particular chipset associated with a particular hardware component. This can be accomplished, for example, by using a private key that corresponds with a particular digital certificate embedded in the target chipset. The digital certificate can be generated based on the private key and embedded in the chipset at the time of manufacture of the chipset. In some instances, the digital signature that is used to sign the access message may also be generated based on the same private key. In some embodiments, the digital certificate may be loaded into the chipset subsequent to the time of manufacture of the chipset. For example, the digital certificate may be generated from a private key in the possession of an operator of the hardware feature access service, and the digital certificate may be loaded into the chipset as part of a process of enrolling the hardware component in the hardware feature access service.

For example, vehicle 134 includes hardware component 124 and associated chipset 128, and hardware component 126 and associated chipset 142. Hardware components 124 and 126 are connected to communication bus 132 via their respective chipsets 128 and 142. Also, operating system 130 for vehicle 134 is connected to communication bus 132. In some embodiments, chipsets 128 and 142 encrypt incoming and outgoing communications directed at hardware components 124 and 126 to or from communication bus 132 when in the "locked" state and decrypt the encrypted communications when in the "unlocked" state. Thus, commands from operating system 130 may not reach hardware components 124 and 126 in an unencrypted form when the respective chipsets 128 and 142 are "locked." Conversely, when the respective chipsets 128 and 142 are "unlocked" commands may arrive at hardware components 124 and 126 in an unencrypted format, after being encrypted and decrypted in respective chipsets 128 and 142. In a similar manner data being communicated from hardware component 124 or hardware component 126 towards communication bus 132 may be encrypted when chipset 128 or chipset 142 is in a "locked" state. In this way the communication may be prevented from being used by operating system 130, because the encrypted communication has little or no meaning to operating system 130. Additionally, when chipsets 128 and 142 are in an "unlocked" state, data directed towards communication bus 132 from hardware component 124 or 126 may be communicated to the communication bus in an unencrypted form (for example after being encrypted and decrypted in chipset 128 or 142). Thus, in an unlocked state, hardware components 124 and 126 may communicate data to operating system 130 and receive data or commands from operating system 130.

In some embodiments, a hardware component key depository of a hardware feature access service, such as hardware component key depository 104 of vehicle feature access service 102, stores private keys corresponding to digital certificates generated from the private keys, wherein the digital certificates are each embedded in a different chip of respective chipsets, each chipset associated with a device enrolled in the hardware feature access service. In some embodiments, asymmetrical encryption may be used to generate the private key and corresponding digital certificate, which may function as a public key corresponding to the given private key. In some embodiments, a public key infrastructure (PKI) may be used to manage keys used to issue access messages that correspond to the digital certificates embedded in the respective chipsets of the devices enrolled in the hardware feature access service. In some embodiments, the hardware component key depository may be implemented via one or more computers and/or storage devices connected to the one or more computers. In some embodiments, multiple computers may be used to implement the various components of a hardware feature access service, such as hardware feature access service 102. In some embodiments, more than one component of a hardware feature access service, such as vehicle feature access service 102, may be implemented on a common computer system.

In some embodiments, a hardware feature set access database, such as vehicle feature set access database 110, stores information indicating which hardware features of devices enrolled in a hardware feature access service are authorized to be "enabled" or "disabled." For example, hardware component 124 may be an additional battery cell in an electric vehicle 134 that is initially locked unless an extended battery-life package is purchased. In such an example, vehicle feature set access database 110 may include multiple entries for vehicle 134, one of which may be an entry for the extended battery-life package. If the extended battery-life package has been authorized for the vehicle 134 (e.g. due to purchase, test trial, etc.) the vehicle feature access database 110 may indicate for the entry corresponding to the extended battery-life package, that the feature set (e.g. the extended battery-life package) is enabled for vehicle 134.

In some embodiments, a hardware communication interface, such as hardware communication interface 114, may be in communication with a hardware feature set access database, such as vehicle feature set access database 110, to cause hardware components associated with enabled feature sets to be "unlocked" and to cause hardware components associated with non-authorized feature sets to be "locked." For example, hardware communication interface 114 may issue one or more access messages to chipsets 128 or 142 instructing the respective chipsets to "lock" or "unlock" the respective hardware components associated with the respective chipsets (e.g. hardware component 124 or 126). In some embodiments, the access messages may include a public key or digital signature generated based on a private key stored in the hardware component key depository 104. The public key or digital signature may complement the digital certificate embedded in the respective chipset 128 or 142, such that the chipset 128 or 142 will not accept messages as authentic messages that do not include the public key or that have not been signed with the digital signature generated based on the private key for that specific chipset.

In some embodiments, a customer service interface, such as customer service interface 108, may implement a webpage, application programmatic interface (API), or other interface configured to receive requests from clients of a hardware feature access service, such as clients 120A thru 120N of vehicle feature access service 102. For example, FIG. 1 illustrates client 120A submitting request 116 to customer service interface 108. Request 116, as an example, is a request for an upgraded entertainment package for vehicle 134. As a further example, hardware component 126 may be a high performance digital signal processor included in a hardware platform of vehicle 134. The high performance digital signal processor may be included in the hardware platform of vehicle 134 in a "locked" state via chipset 142, unless an upgraded entertainment package has been purchased for vehicle 134. Accordingly, in response to the request 116 for the upgraded entertainment package, the customer service interface may determine whether or not client 120A is entitled to the upgraded entertainment package, e.g. has client 120A purchased the upgraded entertainment package, does client 120A qualify for a trial use of the upgraded entertainment package, etc. In response to determining client 120A is entitled to the upgraded entertainment package, the customer service interface 108 may cause the vehicle feature set access database 110 to be updated to indicate that the upgraded entertainment package is enabled for vehicle 134. Additionally, the customer service interface 108 and/or the vehicle feature set access database 110 may cause the hardware communication interface 114 to issue an access message to chipset 142, wherein in response to the access message, chipset 142 changes state to an "unlocked state" and permits, or enables, data to flow to and from the high performance digital signal processor (e.g. hardware component 126).

As another example, client 120N may be a subsequent owner of vehicle 134 and may submit request 118 to customer service interface 108. The request 118 may be a request for upgraded battery performance. Customer service interface 108 may verify that client 120N is the current owner of vehicle 134 or is otherwise entitled to manage feature sets for vehicle 134. This can be accomplished via any suitable authentication mechanism. Additionally, customer service interface 108 may cause vehicle feature set access database 110 to be updated to indicate that the upgraded battery performance package is enabled for vehicle 134. Additionally, the customer service interface 108 and/or vehicle feature access database 110 may cause hardware communication interface 114 to issue an access message to chipset 128 instructing the chipset 128 to change states from a "locked" state to an "unlocked" state. In some embodiments, the access message sent to chipset 128 may be signed with a digital signature generated based on a private key that was also used to generate a digital certificate embedded in at least one chip of chipset 128. Data generating the digital signature may be stored in hardware component key depository 104. In some embodiments, chipset 128 may only accept access messages or revocation messages as authentic messages, when the access messages or revocation messages are signed with a digital signature corresponding to the digital certificate embedded in the at least one chip of chipset 128. In furtherance of the example, hardware component 124 may be an additional battery cell, and unlocking chipset 128 may enable operating system 130 to communicate with the additional battery cell (e.g. hardware component 124) in order to provide upgraded battery performance.

In some embodiments, enabling an additional feature set may involve both "unlocking" relevant hardware components to support the additional feature set and updating firmware or software on the device enrolled in the hardware feature access service. In some embodiments, feature set firmware/software depository 106 stores firmware or software for enabling additional feature sets for devices enrolled in a hardware feature access service, such as vehicle feature access service 102. For example, feature set firmware/software depository 106 may store a firmware update for a battery cell manager that is needed to support the upgraded battery performance package. As another example, feature set firmware/software depository 106 may store software for enabling the upgraded entertainment package that takes advantage of the high performance digital signal processor that was unlocked (e.g. hardware component 126).

In some embodiments, firmware/software update service 112 may coordinate software or firmware updates to devices enrolled in a hardware feature access service, such as vehicle feature access service 102. For example, firmware/software update service 112 may securely connect to respective hardware components and/or an operating system of a device enrolled in a hardware feature access service, such as operating system 130, over a network to install upgraded firmware or software on the hardware components or a computer system that implements the operating system, such as a computer system that implements operating system 130. In some embodiments, firmware/software update service, such as firmware/software update service 112, may initiate a secure encrypted communication channel between one or more computers implementing a hardware feature access service and a device enrolled in the hardware feature access service. The secure communication channel may be used to perform firmware or software updates. In some embodiments, a firmware/software update service, such as firmware/software update service 112, may be configured to perform partial updates when connectivity is available to a given device (e.g. vehicle 134) and progressively download and/or install upgraded firmware or software on the device when connectivity to the device is available.

In some embodiments, wherein a trial period is requested for a given feature set, a hardware communication interface, such as hardware communication interface 114, may indicate a fixed time period for access to be granted to a given hardware component as part of the trial period. In such embodiments, a chipset of an enrolled device may "unlock" an associated hardware component for the fixed time period, and may revert to a "locked" status at the expiration of the fixed duration time period. In some embodiments, a customer service interface and/or a hardware feature set access database, such as customer service interface 108 and/or vehicle feature access database 110, may track an amount of time that has elapsed towards the fixed duration time limit of the trial period. In such embodiments, the customer service interface and/or the hardware feature set access database may cause a hardware communication interface, such as hardware communication interface 114, to issue a revocation message to the chipset associated with the given hardware component to "lock" the given hardware component at the expiration of the fixed duration trial period.

In some embodiments, a hardware feature access service, such as vehicle feature access service 102, may offer various access options to clients, such as clients 120A thru 120N. For example, a client may be enabled to permanently enable a feature set, try a feature set as part of a trial mode, purchase a feature set for a fixed amount of time (e.g. time boxed access, such as in a rental car where a client may purchase access to an enhanced stereo system for an amount of time corresponding to the time of the rental). In some embodiments, clients may be enabled to transfer ownership of feature sets between clients of the hardware feature access service, or even rent features owned by a particular client to another client for a fixed amount of time. Also, as discussed in more detail below, a client may configure a roaming profile or roaming driver profile that enables the client to use feature sets associated with the client's roaming profile in any device enrolled in the hardware feature access service.

As just a few examples, feature sets offered by a vehicle feature access service, such as vehicle feature access service 102, may include: a lane assist feature, a blind-spot detection feature, a dash cam feature, an increased range feature for electric vehicles, a sports handling feature (that unlocks hardware components to adjust suspension performance), an enhanced stereo feature, a feature that enables additional screens in the vehicle (such as in a second or third row), a feature that enables additional amplifiers or other hardware to improve audio quality, etc. In some embodiments, a hardware feature access service or vehicle feature access service may be used to manage rights to various other feature sets, or types of hardware components, of other types of devices or vehicles.

As just a few examples, hardware components that may be locked or unlocked by a hardware or vehicle feature access service may include, but are not limited to, a controller for a battery cell, a digital signal processor for a stereo system, a camera (for example for lane-assist), a dash camera, a pressure sensor, a temperature sensor, a communication interface (such as a blue tooth interface, Wi-Fi interface, etc.). Note the above list is given to provide examples and is not an exhaustive or exclusive list of hardware components that may be managed by hardware features access service. In some embodiments, various other types of hardware components may be managed via hardware feature access service.

In some embodiments, a vehicle feature set access database, such as vehicle feature set access database 110 may store a features manifest for a vehicle or may store information derived from a features manifest for a vehicle. In some embodiments, an initial purchaser of a vehicle and an initial seller of a vehicle may negotiate which features are to be enabled for the vehicle and on what basis (e.g. permanently, for a fixed amount of time, on a subscription basis, while the buyer is in possession of the vehicle, pay-per-use, etc.). In some embodiments, the features manifest for the vehicle may be a digital document and may be adjustable by the owner via a website or other means via the customer service interface. Also, in some embodiments, the features manifest for the vehicle may be transferrable to an additional purchaser of the vehicle who purchases the vehicle from the initial purchaser or another preceding purchaser. In some embodiments, upon verifying authority over the vehicle and/or the features manifest for the vehicle, the additional purchaser may then assume authority to request modifications of feature sets for the vehicle and the feature set manifest for the vehicle may be adjusted accordingly.

In some embodiments, a hardware feature access service, such as vehicle feature access service 102, may provide wider access and lower barriers to entry for consumers of devices, such as vehicles. For example, by only requiring a purchaser to pay for features that the purchaser needs or prefers, a greater number of purchasers may be enabled to purchase the device, e.g. vehicle. Also, such an approach allows manufacturers of devices to be compensated for features that consumers value, while being able to take advantage of efficiencies associated with standardized hardware platforms. Thus, in some embodiments a hardware feature access service or a vehicle feature access service may implement a features rights management system that allows rights for hardware features of devices to be locked and unlocked with minimal costs and that also protects against unauthorized uses of hardware features (e.g. hacking of the hardware features without purchasing the related hardware features).

Figure 2:
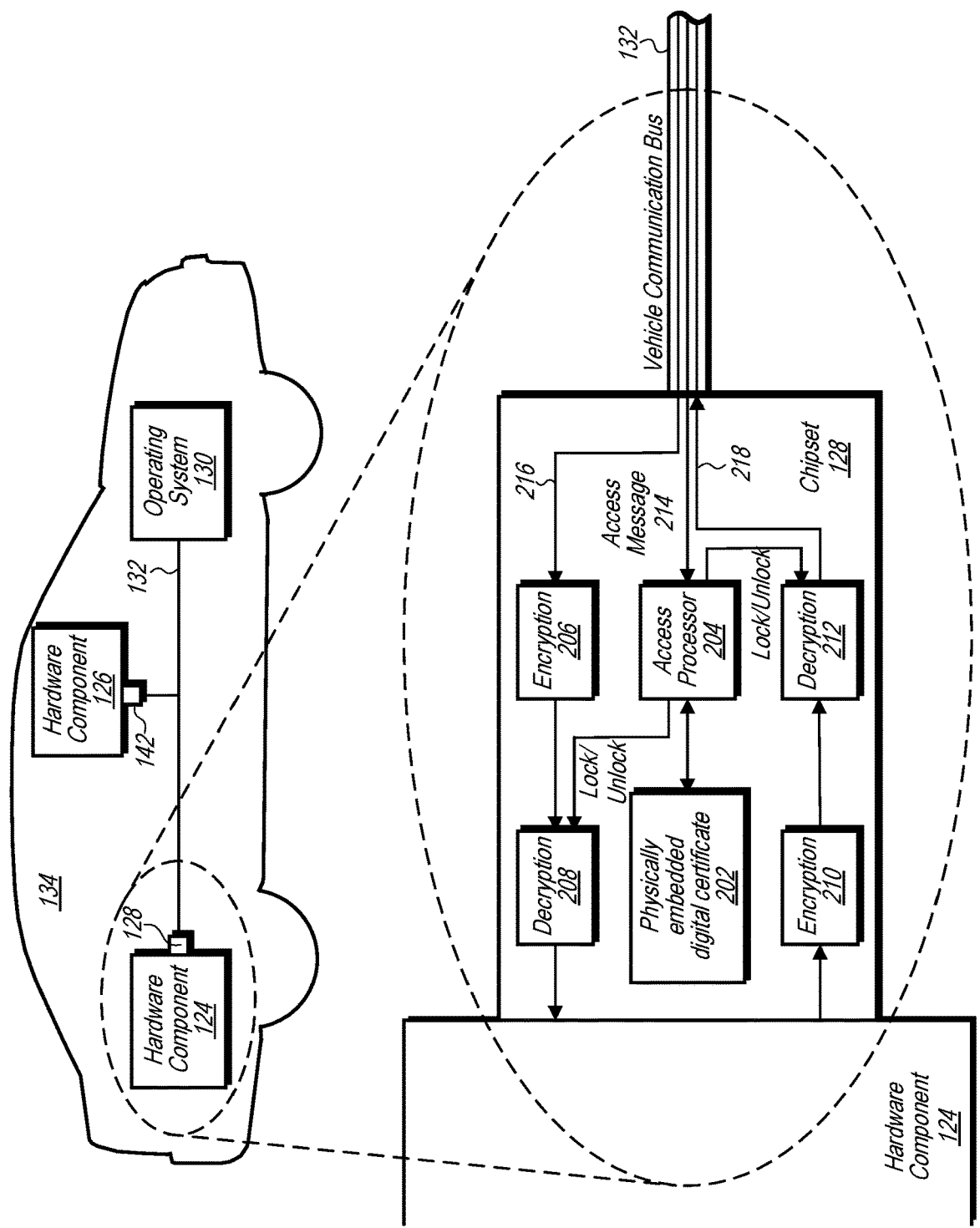
FIG. 2 illustrates a more detailed view of a chipset associated with a hardware component of a vehicle enrolled in the vehicle feature access service, wherein the chipset locks or unlocks the hardware component in response to access messages signed with a private key that corresponds to a digital certificate permanently written into the hardware of at least one chip of the chipset associated with the hardware component, according to some embodiments.

FIG. 2 illustrates a more detailed view of a chipset associated with a hardware component of a vehicle enrolled in the vehicle feature access service, wherein the chipset locks or unlocks the hardware component in response to access messages signed with a private key that corresponds to a digital certificate permanently written into the hardware of at least one chip of the chipset associated with the hardware component, according to some embodiments.

FIG. 2 includes vehicle 134 as illustrated in FIG. 1 and includes a more detailed view of the chips included in chipset 128 associated with hardware component 124 of vehicle 134. In some embodiments, other chipsets associated with other hardware components of a device, such as chipset 142 associated with hardware component 126 of vehicle 134, may include similar components as chipset 128.

In some embodiments, a chipset used by a hardware feature access service to manage rights to a hardware component, such as chipset 128, may include an incoming data encryption module, such as incoming encryption chip 206, an incoming data decryption module, such as incoming decryption chip 208, an outgoing data encryption module, such as outgoing encryption chip 210, an outgoing data decryption module, such as outgoing decryption chip 212, a physically embedded digital certificate module, such as physically embedded digital certificate chip 202, and an access processor, such as access processor 204. In some embodiments, an access processor may establish a connection with a hardware communication interface of a hardware feature access service, such as hardware communication interface 114 of vehicle feature access service 102, via a wireless network, such as network 122. The access processor may receive access messages or revocation messages from the hardware communication interface and may determine the authenticity of the access messages or revocation messages based on comparing a digital signature used to sign the messages to the digital certificate physically embedded in digital certificate chip 202. If the access message or revocation message is deemed authentic by access processor 204, based on the digital certificate embedded in the chipset, the access processor may act upon the access message or revocation message by causing decryption modules, such as incoming decryption chip 208 and outgoing decryption chip 212 to decrypt incoming and outgoing data streams. In this way, operating system 130 may be able to communicate with hardware component 124 via communication bus 132 when chipset 128 is "unlocked." Similarly, when chipset 128 is "locked" incoming data may be encrypted via incoming encryption chip 206 and outgoing data may be encrypted via outgoing encryption chip 210. However, in the "locked" state, decryption chips 208 and 212 may not decrypt the encrypted data. Thus, non-encrypted communications cannot be exchanged between operating system 130 and hardware component 124 via communication bus 132 connected to hardware component 124 via chipset 128, when the chipset 128 is in a "locked" state.

A chipset arrangement as illustrated in FIG. 2 may provide greater security than software designs that enable or disable feature sets for a device. This is because putting the chipset directly in front of a hardware component prevents software from accessing the hardware component and requires physically tampering with the chipset to defeat the security of the chipset. Moreover, in some embodiments, a chipset, such as chipset 128, may be encased in a tamper-proof, tamper-resistant, or tamper-respondent casing. In such embodiments, chipset 128 may be configured to permanently enter a locked state if tampering occurs.

In some embodiments, a hardware communication interface, such as hardware communication interface 114, may establish a session with a chipset associated with a particular hardware component, such as chipset 128 associated with hardware component 124. In some embodiments, the hardware communication interface may instruct the chipset to enter an "unlocked" state while the session is open and revert to a "locked" state when the session is terminated or otherwise ends.

In some embodiments, a hardware component connected to a communication bus of a device via a chipset, such as hardware component 124 connected to communication bus 132 via chipset 128, may be any of various types of hardware components. For example, in some embodiments a chipset, such as chipset 128, may be associated with a hardware component such as a GPS hardware component, a Wi-Fi hardware component, a Bluetooth hardware component, a GSM modem hardware component, or any of the hardware components described herein.

In some embodiments, a chipset, such as chipset 128, may be positioned in a communication path between an interface configured to couple with a hardware component and a communication bus, such as communication bus 132. For example, in some embodiments, a vehicle may include interfaces for accepting authorized bolt-on hardware components, such as an after-market camera, etc. In some embodiments, a chipset, such as chipset 128, may read information from a corresponding interface of the bolt-on hardware component and pass this information to the hardware feature access service via hardware communication interface 114. The hardware feature access service may determine whether or not the bolt-on hardware component is an authorized hardware component and, if so, may send an access message to the chipset associated with the interface. In response to receiving the access message, the associated chipset may be "unlocked" and may allow the bolt-on hardware component to communicate with the communication bus. Otherwise, the chipset associated with the interface may be "locked" and may prevent unauthorized bolt-on hardware components from communicating with the communication bus of the device. Additionally, in such embodiments, the chipset may provide security prevent unknown or unauthorized devices from interfering with the device, for example by submitting communications to a communication bus of the device, such as communication bus 132.

Figure 3:
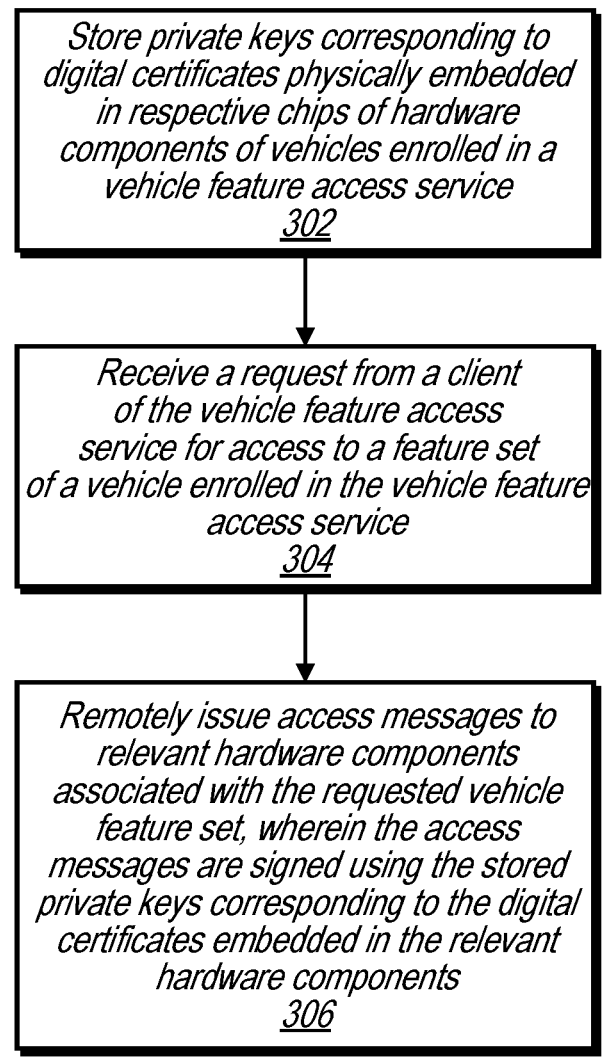
FIG. 3 illustrates a flowchart for remotely enabling feature sets for vehicles enrolled in a vehicle feature access service, according to some embodiments.

FIG. 3 illustrates a flowchart for remotely enabling feature sets for vehicles enrolled in a vehicle feature access service, according to some embodiments.

At 302, a vehicle feature access service, such as vehicle feature access service 102, stores private keys corresponding to digital certificates physically embedded, or otherwise loaded, in respective chips of hardware components of vehicles enrolled in the vehicle feature access service. For example, a vehicle feature access service may obtain, for example via secure means, private keys corresponding to chipsets included in vehicles enrolled in the vehicle feature access service. In some embodiments the private keys may be stored in a hardware component key depository of a vehicle feature access service, such as hardware component key depository 104 of vehicle feature access service 102, at the time the chipset that includes the digital certificate is fabricated or the time that the hardware component that includes the chipset including the digital certificate is manufactured.

At 304, the vehicle feature access service may receive a request from a client of the vehicle feature access service for access, or to enable, a feature set of a particular vehicle enrolled in the vehicle feature access service. For example, an owner or other person in control of a vehicle enrolled in the vehicle feature access service may submit a request to the vehicle feature access service to be provided access to, or to enable, a particular feature set in the vehicle. For example, the request may be to provide a "lane assist" feature, provide upgraded audio performance, provide additional battery capacity, etc.

At 306, in response to receiving the request and optionally in response to determining the client is eligible for the requested feature set, the vehicle feature access service remotely issues access messages to chipsets associated with relevant hardware components necessary to provide access to the additional feature set or to enable the additional feature set. The access messages may be signed with a digital signature generated using the respective private keys stored for the chipsets associated with the relevant hardware components. For example, the private keys may have been generated using asymmetric encryption techniques, such that a public key or digital signature can be generated from the private key, but if intercepted, the public key or digital signature cannot be used to reverse engineer the private key. Also, the public keys or digital signatures may correspond to the digital certificates physically embedded, or otherwise loaded, in the chipsets. In some embodiments, an access processor may be able to determine the authenticity of the access message, e.g. that the access message was actually authored by the vehicle feature access service and has not been altered, by comparing, or otherwise analyzing, the digital signature included with the access message relative to the respective digital certificate embedded in a chip of the respective chipset. Upon verifying the authenticity of the access message, the access processor may cause the chipset to "unlock" to provide access to the chipset's associated hardware component and to enable the requested feature set requested by the client. As discussed above, in some embodiments, a vehicle feature access service, may further coordinate updates to firmware or software of a vehicle in order to enable a requested vehicle feature set in addition to unlocking hardware components relevant to implementing the requested vehicle feature set.

Figure 4:
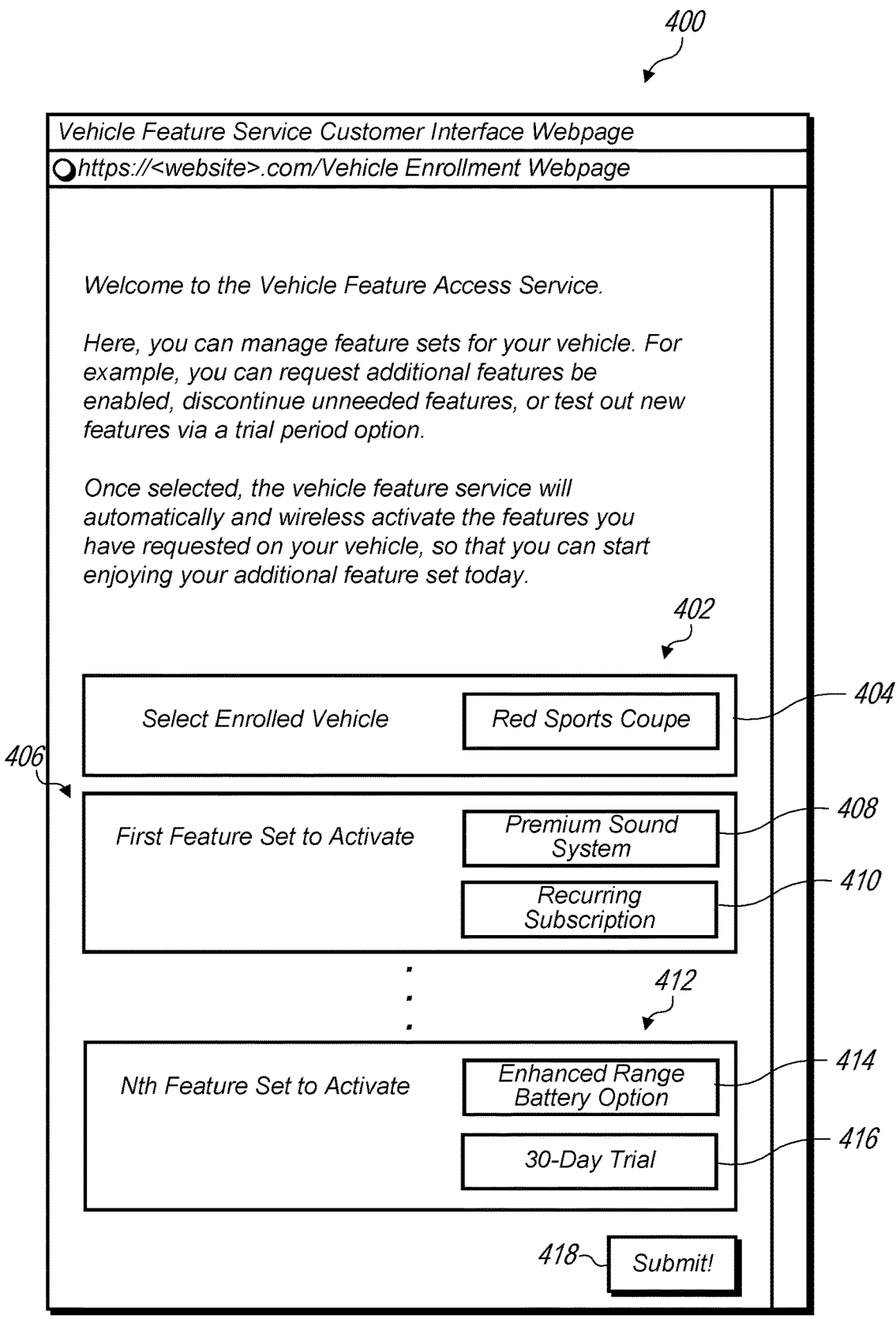
FIG. 4 illustrates an example customer interface of a vehicle feature access service for requesting one or more vehicle feature sets to be enabled for a vehicle enrolled in the vehicle feature access service, according to some embodiments.

FIG. 4 illustrates an example customer interface of a vehicle feature access service for requesting one or more vehicle feature sets to be enabled for a vehicle enrolled in the vehicle feature access service, according to some embodiments.

Figure 5:
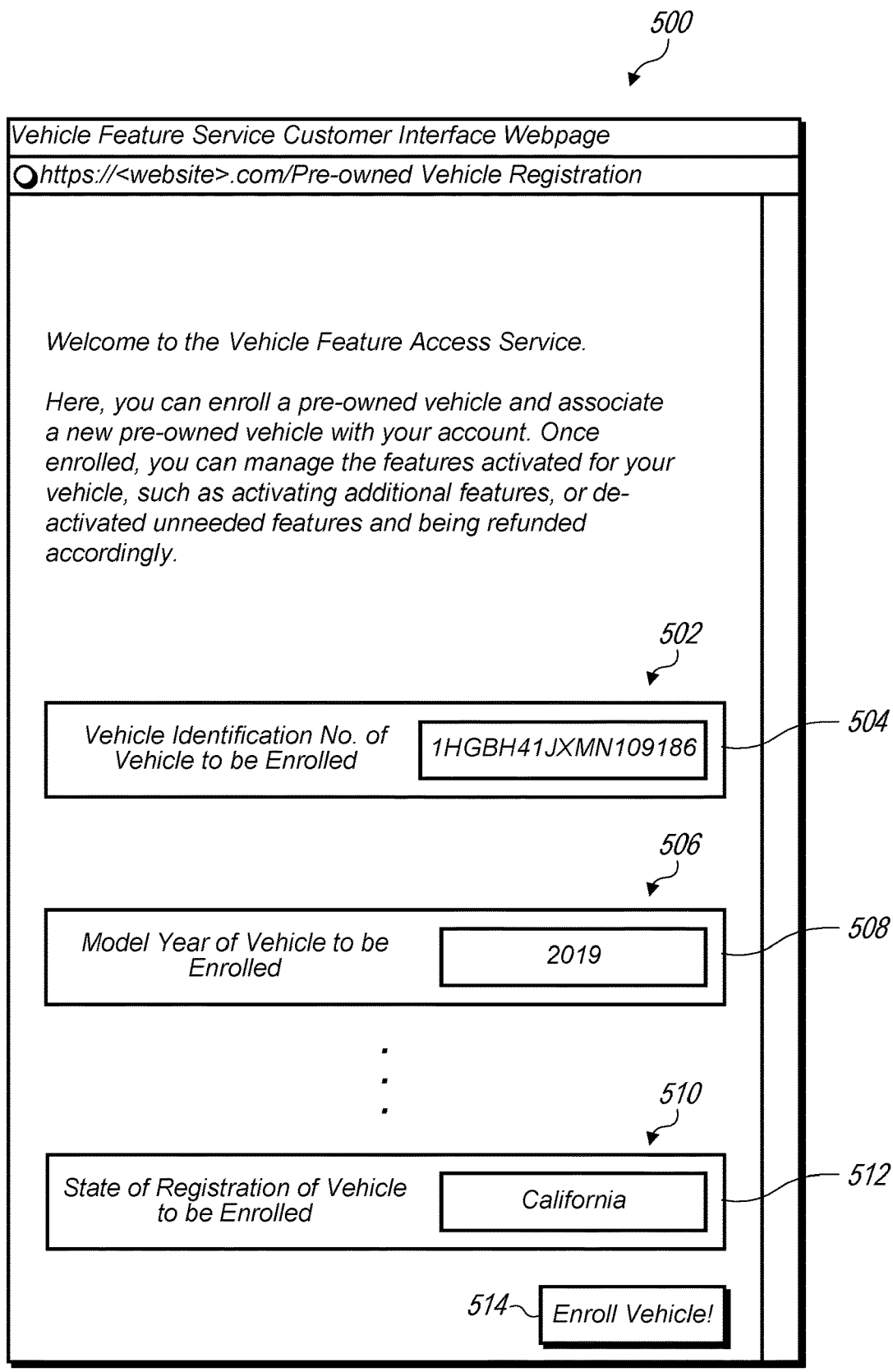
FIG. 5 illustrates an example customer interface of a vehicle feature access service for enrolling a vehicle in the vehicle feature access service, according to some embodiments.
Figure 6:
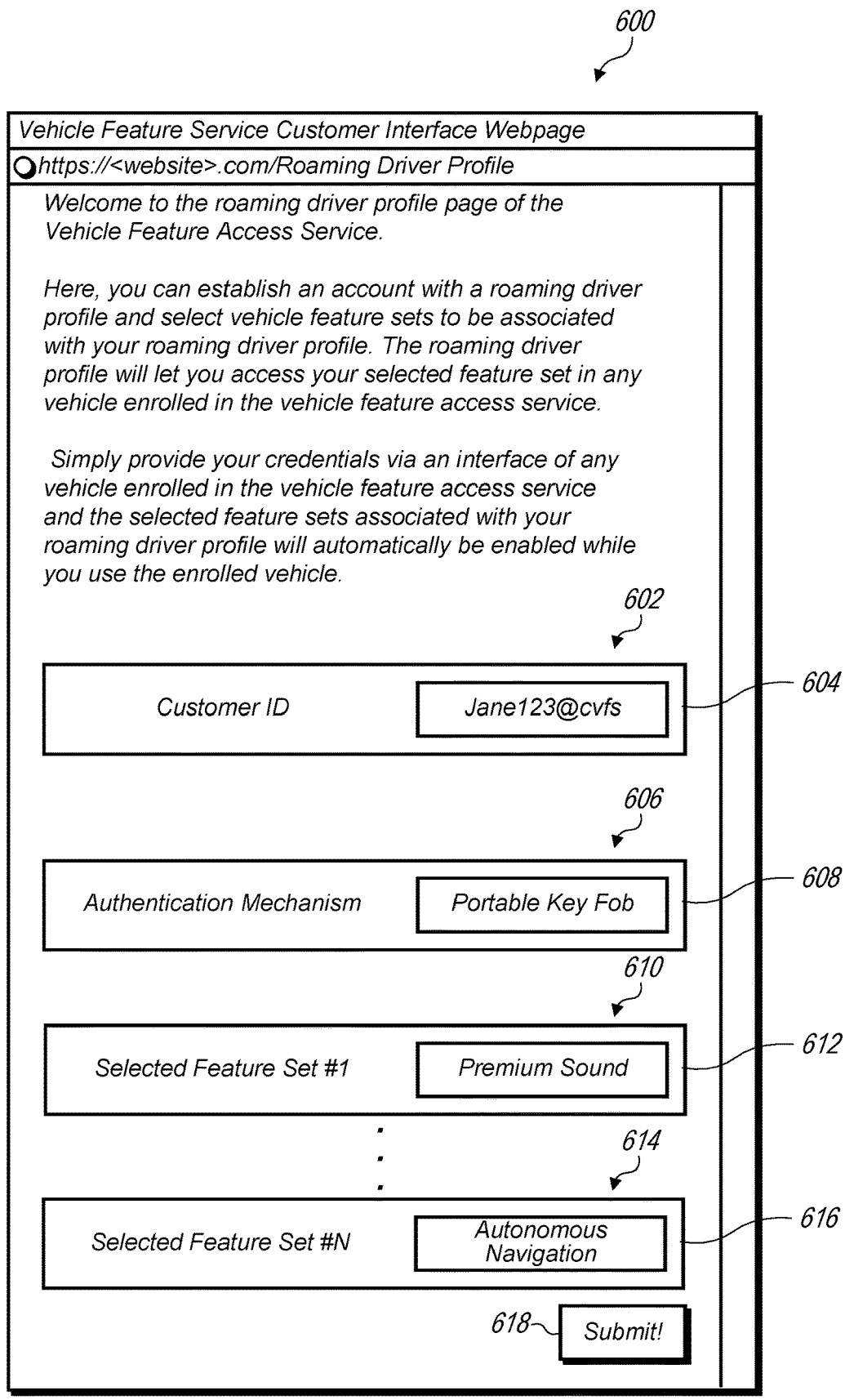
FIG. 6 illustrates an example customer interface of a vehicle feature access service for establishing a roaming driver profile with the vehicle feature access service, according to some embodiments.
Figure 8:
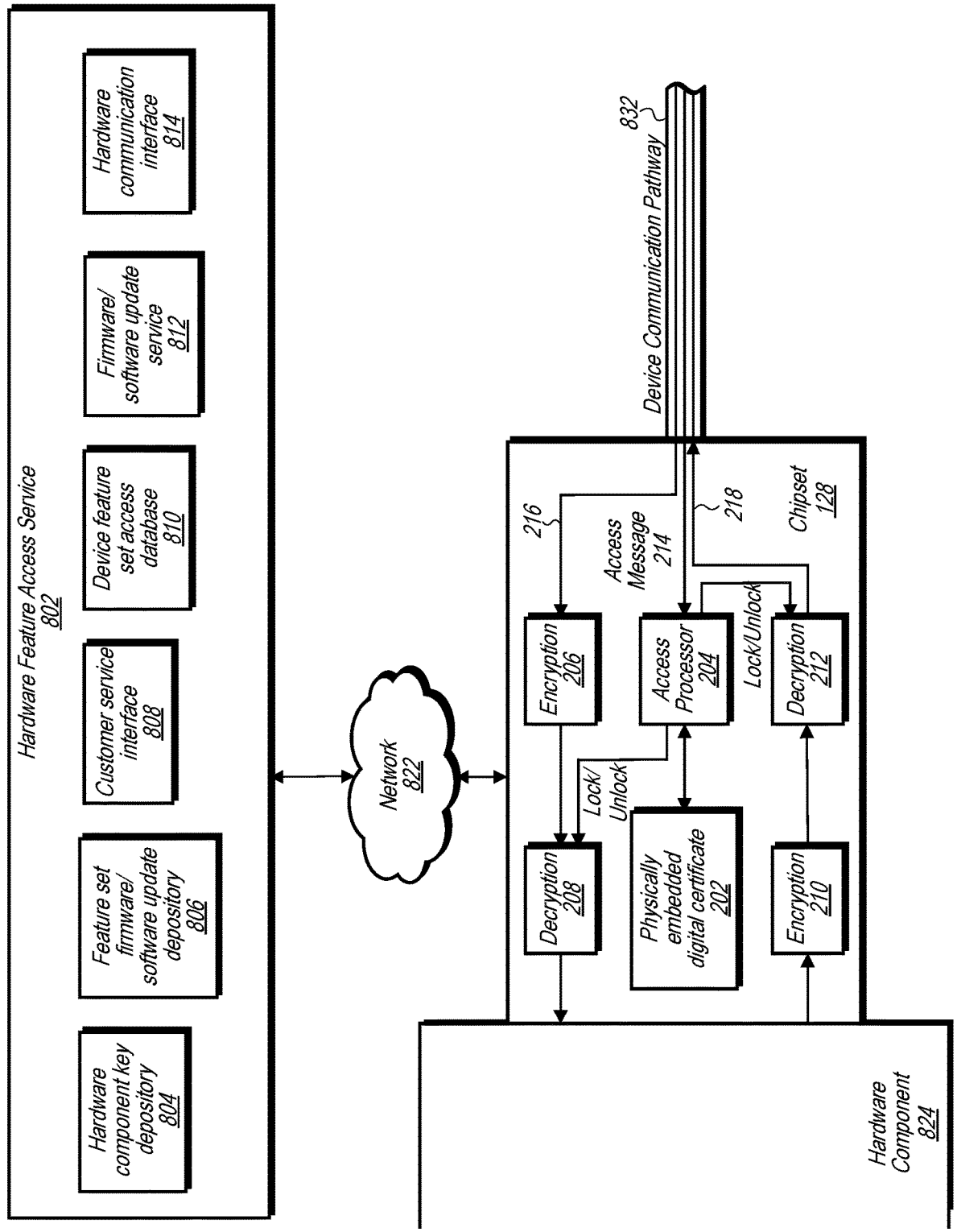
FIG. 8 illustrates an example hardware feature access service and a hardware component and associated chipset of a device enrolled in the hardware feature access service, wherein the chipset locks or unlocks the hardware component in response to access messages signed with a private key that corresponds to a digital certificate permanently written into the hardware of at least one chip of the chipset associated with the hardware component, according to some embodiments.

In some embodiments, a hardware feature access service, such as vehicle feature access service 102 or hardware feature access service 802 illustrated in FIG. 8, may implement interface pages, such as interface pages 400, 500, and 600 shown in FIGS. 4-6. Note that FIGS. 4-6 illustrate example interface pages for a vehicle feature access service. However, in some embodiments, user interface pages similar to those shown in FIGS. 4-6 may be adapted for a hardware feature access service that manages rights to physical hardware components of devices other than vehicles.

Interface page 400 provides an interface for a client of a vehicle feature access service, such as vehicle feature access service 102, to manage feature sets for a vehicle enrolled in the vehicle feature access service. In some embodiments, a customer service interface of a vehicle feature access service, such as customer interface 108, may implement an interface page, such as interface page 400. In some embodiments, requests for vehicle feature sets to be enabled, such as requests 116 and 118, may be submitted via an interface page, such as interface page 400.

In some embodiments, an interface page, such as interface page 400, includes an entry space for specifying which vehicle is to have changes made to the vehicle's enabled feature sets. For example, entry space 402 allows a client to select an enrolled vehicle for which feature sets may be adjusted. As shown in FIG. 4, entry space 402 includes a selector 404, wherein the client has selected the "red sports coupe" as the enrolled vehicle for which feature sets are to be adjusted.

In some embodiments, an interface page, such as interface page 400, may also include any number of feature set options, of which the client may select to enable or disable the corresponding feature set options. In some embodiments, an interface page, such as interface page 400, may further include a terms option entry area, wherein a client may specify or select terms upon which a selected feature set is to be enabled. For example, feature set option box 406 includes feature set selector 408 and term selector 410. As an example, the client has selected to upgrade the red sports coupe indicated via selector 404 to enable the premium sound system selected via feature set selector 408 on a recurring subscription basis selected via term selector 410. As another example, the client has selected to upgrade the red sports coupe to enable the enhanced range battery indicated via feature set selector 414 of an additional feature set option box 412, and has selected to enable the enhanced range battery option on a 30-day trial basis selected via term selector 416.

Additionally, interface page 400 includes submit button 418. In some embodiments, in response to a client selecting submit button 418 a customer service interface of a hardware feature access service, such as customer service interface 108 of vehicle feature access service 102, may cause a hardware communication interface, such as hardware communication interface 114, to issue access messages to relevant hardware components in a target device, such as the red sports coupe, to unlock the relevant hardware components such that the selected feature sets may be enabled on the target device. In some embodiments, in response to a client selecting the submit button, a customer service interface may also cause a device feature set access database, such as vehicle feature set access database 110, to be updated to indicate the newly enabled features/unlocked hardware components. Also, in some embodiments, in response to a client selecting the submit button, a customer service interface may also cause a firmware or software update to be initiated on the target device to upgrade firmware or software required to implement the selected feature set in addition to unlocking one or more hardware components needed to enable the selected feature set.

FIG. 5 illustrates an example customer interface of a vehicle feature access service for enrolling a vehicle in the vehicle feature access service, according to some embodiments.

In some embodiments, a hardware feature access service, such as vehicle feature access service 102 or device feature access service 802 illustrated in FIG. 8, may implement an additional interface page, such as interface page 500 shown in FIG. 5.

Interface page 500 provides an interface for a client of a vehicle feature access service, such as vehicle feature access service 102, to enroll a vehicle in the vehicle feature access service or to transfer authority of a vehicle already enrolled in the vehicle feature access service to the client. In some embodiments, a customer service interface, such as customer interface 108, may implement an interface page, such as interface page 500. In some embodiments, an interface page, such as interface page 500, may be adapted for enrolling other types of devices, other than vehicles.

Interface page 500 includes vehicle identity entry areas 502, 506, and 510, wherein a client may enter unique identifying information about a vehicle to be added to the client's account. For example, entry box 504 includes a Vehicle Identification Number (VIN) for the vehicle, entry box 508 includes a year model for the vehicle, and entry box 512 includes a state of registration for the vehicle. In some embodiments, various other types of identifying information may be entered via interface page 500 to identify a vehicle to be added to the client's account. Additionally, interface page 500 includes an enrollment button 514 to initiate the process of enrolling the identified vehicle, such that the identified vehicle is associated with the client's account with the vehicle feature access service. In some embodiments, in response to the enrollment button 514 being selected, a customer service interface of a hardware feature access service, such as customer service interface 108 of vehicle feature access service 102, may analyze one or more datasets stored by the vehicle feature access service, and/or one or more public databases to verify that the client is the owner of the identified vehicle or has appropriate authority over the identified vehicle to assume control over vehicle feature sets for the identified vehicle. Also, in some embodiments, wherein the hardware feature access service manages other types of device, other than vehicles, a similar process may be performed to verify ownership or authority over a given device.

FIG. 6 illustrates an example customer interface of a vehicle feature access service for establishing a roaming driver profile with the vehicle feature access service, according to some embodiments. While FIG. 6 shows an interface page for establishing a roaming driver profile with a vehicle feature access service, in some embodiments, a similar interface may be adapted for establishing a roaming profile with a hardware feature access service that includes devices enrolled in the hardware feature access service other than, or in addition to, vehicles.

For example, interface page 600, includes client identification box 602, wherein the client enters information identifying the client account for which the roaming driver profile is to be established. For example, the client has entered a client account identifier in box 604 of client identification box 602.

Interface page 600 also includes an authentication mechanism box 606, wherein the client may select an authentication mechanism to be used to authenticate the client's identity when using enrolled vehicles. For example, the client has selected in box 608 to use a portable key fob authentication mechanism. In some embodiments, a client may select other authentication mechanisms, such as a username and password, portable device identification mechanism, wherein a portable device such as mobile phone emits a signal to authenticate the client and/or presents a code on a display of the portable device to authenticate the client, wherein enrolled vehicles include a reader to receive the displayed code or the emitted signal. In some embodiments, wherein a portable key fob is selected, the vehicle feature access service may cause a portable electronic device (e.g. a key fob) to be mailed to the client, wherein the key fob emits a unique signal that may be used to authenticate the client in vehicles enrolled in the vehicle feature access service.

Interface page 600 also includes feature set option boxes, such as feature set option boxes 610 and 614, wherein a client may select feature sets to be associated with the client's roaming driver profile. For example, in selector 612 the client has selected a premium sound feature set and in selector 614 the client has selected an autonomous navigation feature set. While not shown, in some embodiments, feature set option boxes, such as feature set option boxes 610 and 614, may further include term selectors, wherein a client may select terms by which particular feature sets are to be added to the client's roaming driver profile.

Interface page 600 also includes submit button 618. In response to a client selecting submit button 618, a vehicle feature access service may establish a roaming driver profile for the client and associate selected feature sets with the client's roaming driver profile. In some embodiments, the client may then use the selected feature sets in any vehicle enrolled in the vehicle feature access service. To do this, the client may provide information as required by the selected authentication mechanism when beginning to use a particular vehicle of a fleet of vehicles enrolled in the vehicle feature access service. This may allow the client to use the client's preferred feature sets in a wide range of vehicles, such as the client's personal vehicle, a rental vehicle, etc. In some embodiments, the client may not have a personal vehicle and may instead use enrolled vehicles as needed and may use the client's roaming driver profile to obtain the client's selected feature sets in any vehicle of the fleet in which the client is currently riding.

Figure 7:
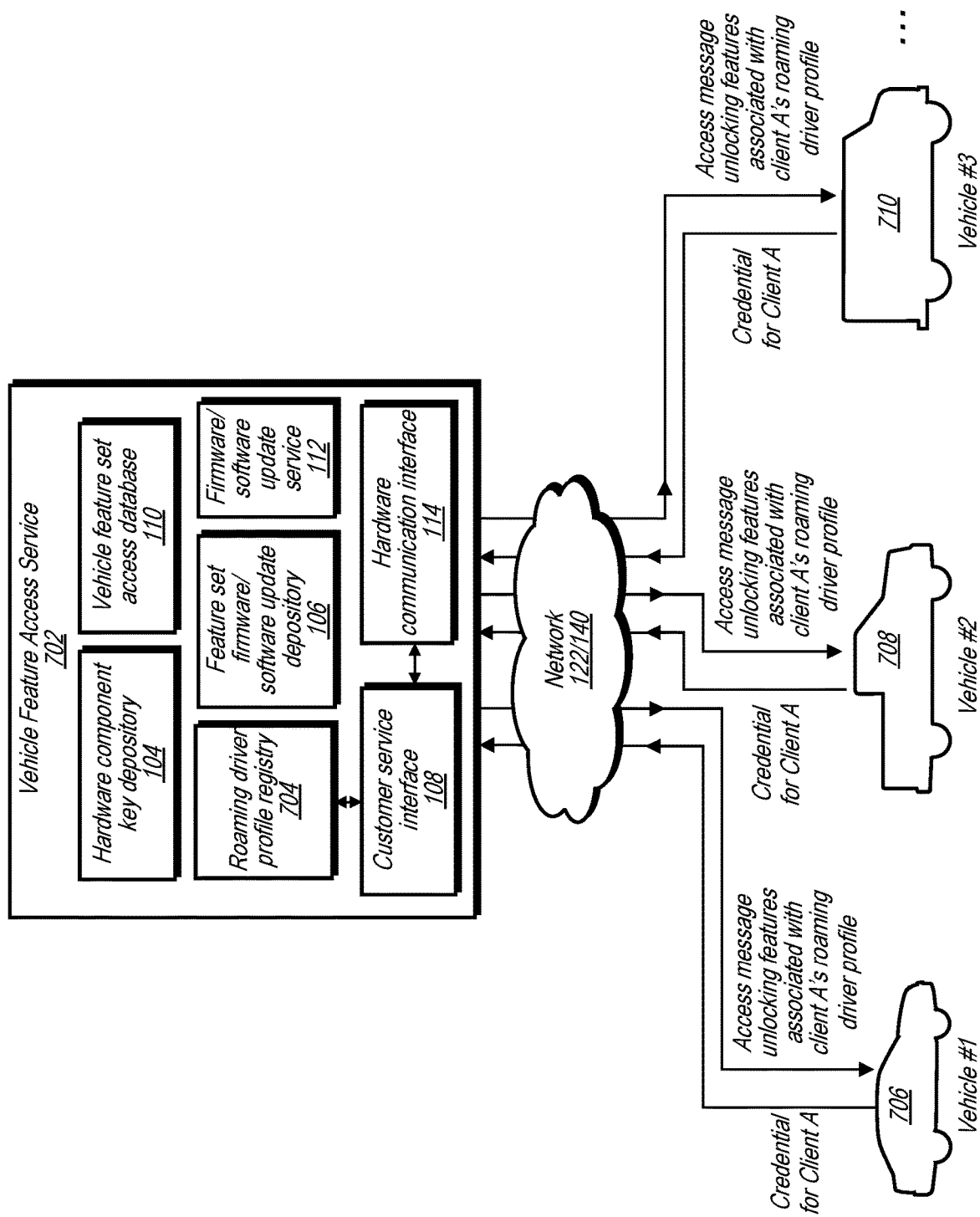
FIG. 7 illustrates a vehicle feature access service supporting a roaming driver profile, and a client of the vehicle feature access service utilizing the client's roaming driver profile to enable vehicle feature sets in multiple vehicles of a fleet of vehicles enrolled in the vehicle feature access service, according to some embodiments.

FIG. 7 illustrates a vehicle feature access service supporting a roaming driver profile, and a client of the vehicle feature access service utilizing the client's roaming driver profile to enable vehicle feature sets in multiple vehicles of a fleet of vehicles enrolled in the vehicle feature access service, according to some embodiments.

Vehicle feature access service 702 may be similar to vehicle feature access service 102 described in FIG. 1. For example, hardware component key depository 104, feature set firmware/software update depository 106, customer service interface 108, vehicle feature set access database 110, firmware/software update service 112, and hardware communication interface 114 may be similar to similarly named components of vehicle feature access service 102. In addition, a vehicle feature access service, such as vehicle feature access service 702, may include a roaming driver profile registry 704. In some embodiments, a roaming driver profile registry may store authentication information for authenticating a client via a client selected authentication mechanism, such as discussed above in regard to FIG. 6. Additionally, the roaming driver profile may store information indicating which feature sets and/or hardware components are enabled for the client' roaming driver profile.

As an example, a vehicle feature access service, such as vehicle feature access service 702, may include a fleet of enrolled vehicles including car 706, truck 708, and van 710. In some embodiments, the enrolled vehicles may be shared vehicles available to the public to use for short amounts of time. For example, a client may use a particular vehicle in the morning to drive to work and may use a different vehicle in the evening to drive home from work, etc. Continuing the example, a client of a vehicle feature access service with a roaming driver profile, such as client A, may take possession of car 706, for example to drive to work in the morning. The client A may provide authentication credentials for client A to an interface of car 706. Car 706 may submit the authentication credentials for client A to vehicle feature access service 702 via network 122. For example, the credentials may be submitted to customer service interface 108. Additionally, customer service interface 108 may consult the roaming driver profile registry 704 to determine if client A has been properly authenticated in car 706 and to determine what feature sets are enabled for client A's roaming driver profile. Additionally, customer service interface 108 or roaming driver profile registry 704 may cause hardware communication interface 114 to issue access messages to chipsets associated with relevant hardware components of car 706 to enable the feature sets associated with client A's roaming driver profile while client A is in possession of car 706.

Continuing the example, client A may release possession of car 706 after driving to work and access to feature sets associated with client A's roaming driver profile may be revoked. For example, the access messages previously sent may grant access for a fixed duration, or for a session period. Alternatively, hardware communication interface 114 may send revocation messages for hardware features previously enabled for client A upon another client taking possession of car 706. In some embodiments, other methods may be performed to grant and revoke access to feature sets based on a roaming driver profile.

Further continuing the example, later in the day client A may take possession of truck 708, for example in order to move large items. In a similar manner as in car 706, client A may present client A's credentials to an interface of truck 708 and vehicle feature access service 702 may enable the vehicle feature sets associated with client A's roaming driver profile in truck 708 while client 708 is in possession of truck 708. Also, at a subsequent time, client A may take possession of van 710, for example to take a large group of people to an event. In a similar manner as in car 706 and truck 708, client A may present client A's credentials to an interface of van 710 and vehicle feature access service 702 may enable the vehicle feature sets associated with client A's roaming driver profile in van 710 while client 708 is in possession of van 710.

In some embodiments, a client may additionally associate one or more vehicle or device configurations with the client's roaming driver profile. For example the client may associate radio presets, seat settings, suspension or shifter settings, etc. with the client's roaming driver profile. In such embodiments, a firmware/software update service, such as firmware/software update service 112, may automatically adjust configuration of a vehicle in the possession of the client to match the configurations associated with the client's roaming driver profile.

FIG. 8 illustrates an example hardware feature access service and a hardware component and associated chipset of a device enrolled in the hardware feature access service, wherein the chipset locks or unlocks the hardware component in response to access messages signed with a private key that corresponds to a digital certificate permanently written into the hardware of at least one chip of the chipset associated with the hardware component, according to some embodiments.

As discussed above, in some embodiments a hardware feature access service may manage rights to hardware components in devices other than, or in addition to vehicles. For example, hardware feature access service 802 may manage rights to hardware components in devices other than, or in addition to vehicles, such as devices in a shared space as described in FIGS. 9A-9C, or other types of devices.

Hardware feature access service 802 includes hardware component key depository 804 that stores data that corresponds to respective digital certificates physically embedded, or otherwise loaded, in respective chipsets of hardware components included in devices enrolled in the hardware feature access service 802. For example, hardware key depository 804 of hardware feature access service 802 stores data corresponding to a digital certificate embedded in chip 202 of chipset 128. In some embodiments, digital certificates are physically embedded in at least one chip of each of the respective chipsets of the hardware components of devices enrolled in the hardware feature access service 802 at the time of manufacture of the respective chips. Also, in some embodiments each chipset, such as chipset 128, is configured to prevent locking or unlocking of the respective chipset's associated hardware component, such as hardware component 824, without being provided an access key corresponding to the digital certificate embedded in the at least one chip of the respective chipset. For example, chipset 128 may lock hardware component 824 away from device communication pathway 832, and in response to a valid access message, may unlock hardware component 824 such that it is reachable via device communication pathway 832.

Hardware feature access service 802 may also include a feature set firmware/software update depository 806 storing firmware or software necessary to implement certain feature sets on devices enrolled in the hardware feature access service 802. Additionally, hardware feature access service 802 may include a firmware/software update service 812 to cause firmware or software of enrolled devices to be updated. For example, in response to an additional feature set being enabled for a given device.

Hardware feature access service 802 also includes a customer service interface 808 and a hardware communication interface 814. The hardware communication interface 814 may be configured to remotely issue one or more access messages to one or more chipsets of one or more hardware components of devices enrolled in the hardware feature access service to unlock the hardware components, wherein the one or more access messages are signed using the data corresponding to the digital certificates physically embedded, or otherwise loaded in the at least one chip of the respective chipsets of the hardware components. For example, hardware communication interface 814 may issue an access message to chipset 128 via network 822. In some embodiments, service interface 808 may be configured to receive a request from a client of the hardware feature access service to provide a device feature set for a given device enrolled in the hardware feature access service and cause the hardware component communication interface 814 to remotely issue one or more access messages to one or more chipsets of one or more relevant hardware components associated with the device feature set to unlock the one or more relevant hardware components and enable the device feature set.

Figure 9A:
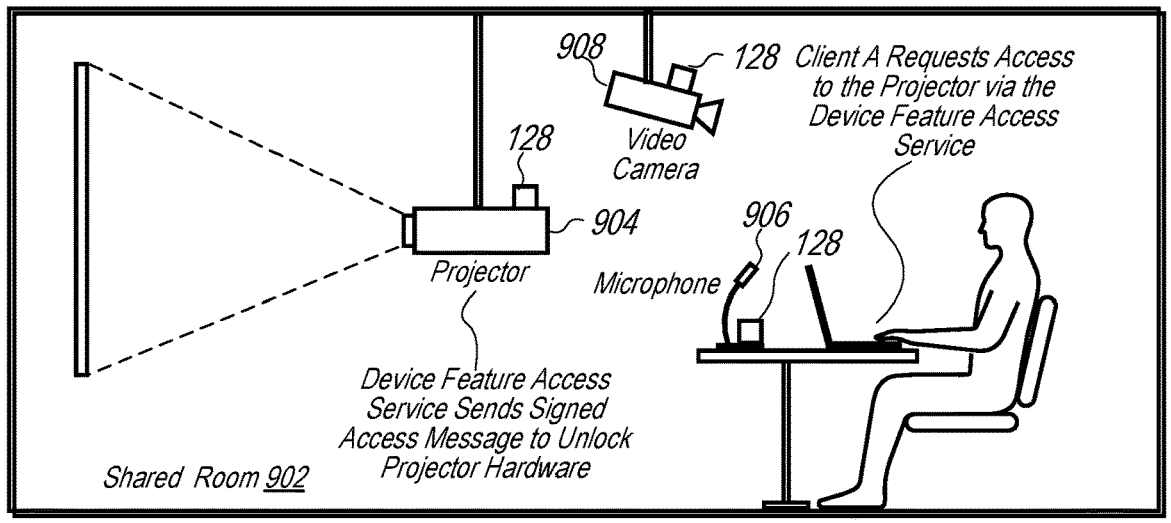
FIGS. 9A-9C illustrate different clients of a device feature access service being provided access to different hardware components in a shared space via the device feature access service, according to some embodiments.
Figure 9B:
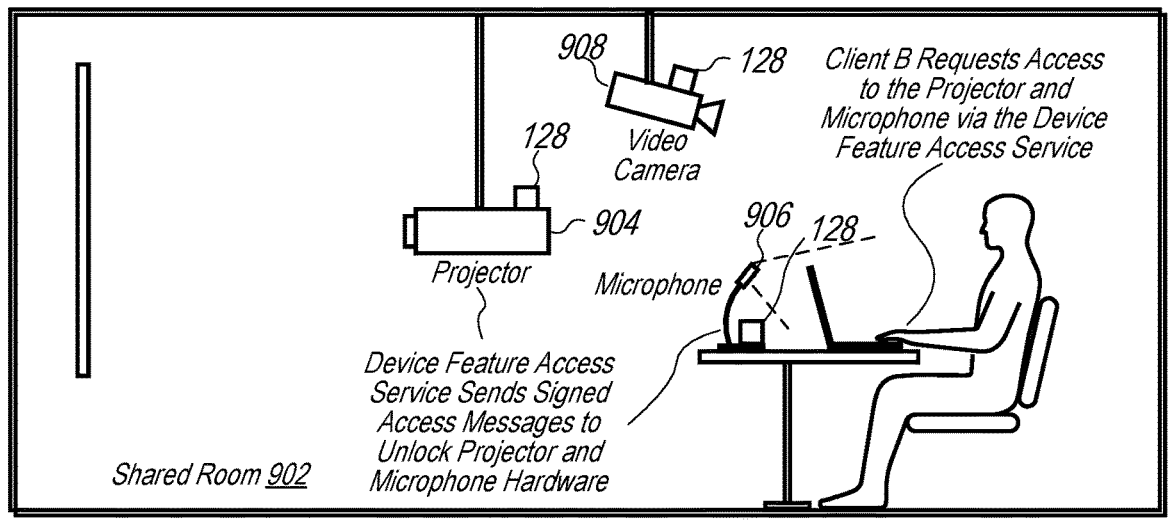
Figure 9C:
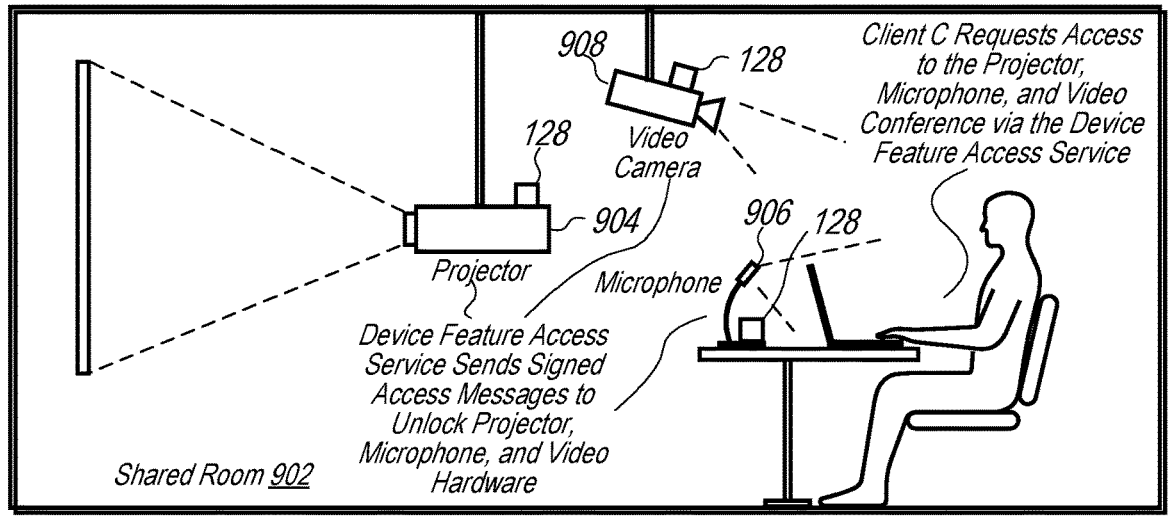

FIGS. 9A-9C illustrate different clients of a device feature access service being provided access to different hardware components in a shared space via the device feature access service, according to some embodiments.

FIGS. 9A-9C illustrate an example of a shared space comprising hardware managed by a hardware feature access service, such as hardware feature access service 802, according to some embodiments. In some embodiments, a shared space, such as shared room 902, may include one or more devices enrolled in a hardware feature access service, such as hardware feature access service 802. For example, shared room 902 includes projector 904, microphone 906, and video camera 908. Each of the devices, may include one or more chipsets that "lock" or "unlock" hardware components of the devices. For example, each of projector 904, microphone 906, and video camera 908 include a chipset 128, which may be similar to chipset 128 described in FIGS. 2 and 8. In some embodiments, chipset 128 may "lock" or "unlock" external communications from a given device. For example, microphone 906 may not be able to transmit audio information from the microphone when the microphone is in a locked state.

As an example, a client A of a hardware feature access service, such as hardware feature access service 802, as shown in FIG. 8, may request access to the projector 904 in the shared room 902. In some embodiments, the client A may submit the request with a request to reserve shared room 902. Additionally, the client may have an account with the hardware feature access service 902. In response to determining the client is entitled to access the projector, for example based on a roaming profile for the client or payment for use of the projector, the hardware feature access service may issue access messages to chipset 128 associated with projector 904 to unlock the projector for the duration of client A's reservation of shared room 902.

Continuing the example in reference to FIG. 9B, another client, client B, may have a subsequent reservation for shared room 902, which requests access to the microphone 906, but not the projector 904. Accordingly, the hardware feature access service may revoke access to the projector 904 and cause one or more access messages to be transmitted to chipset 128 associated with microphone 906 to unlock the microphone 906. As another example in reference to FIG. 9C, a different client, client C, may have a further reservation for shared room 902, which requests access to projector 904, microphone 906, and video camera 908. Accordingly, the hardware feature access service may send access messages to chipsets 128 associated with each of the projector 904, the microphone 906, and the video camera 908 to unlock hardware components of these devices for the duration of client C's reservation of shared room 902. As can be seen, in some embodiments, a hardware feature access service may allow access to hardware components of devices in a shared space, such as shared room 902, to be particularly tailored to the needs of users of the shared space. This may allow a customer of the hardware feature access service to be provided access to devices the customer needs or prefers to use while allowing the customer to avoid paying for access to devices that the customer does not need or prefer to use.

Figure 10:
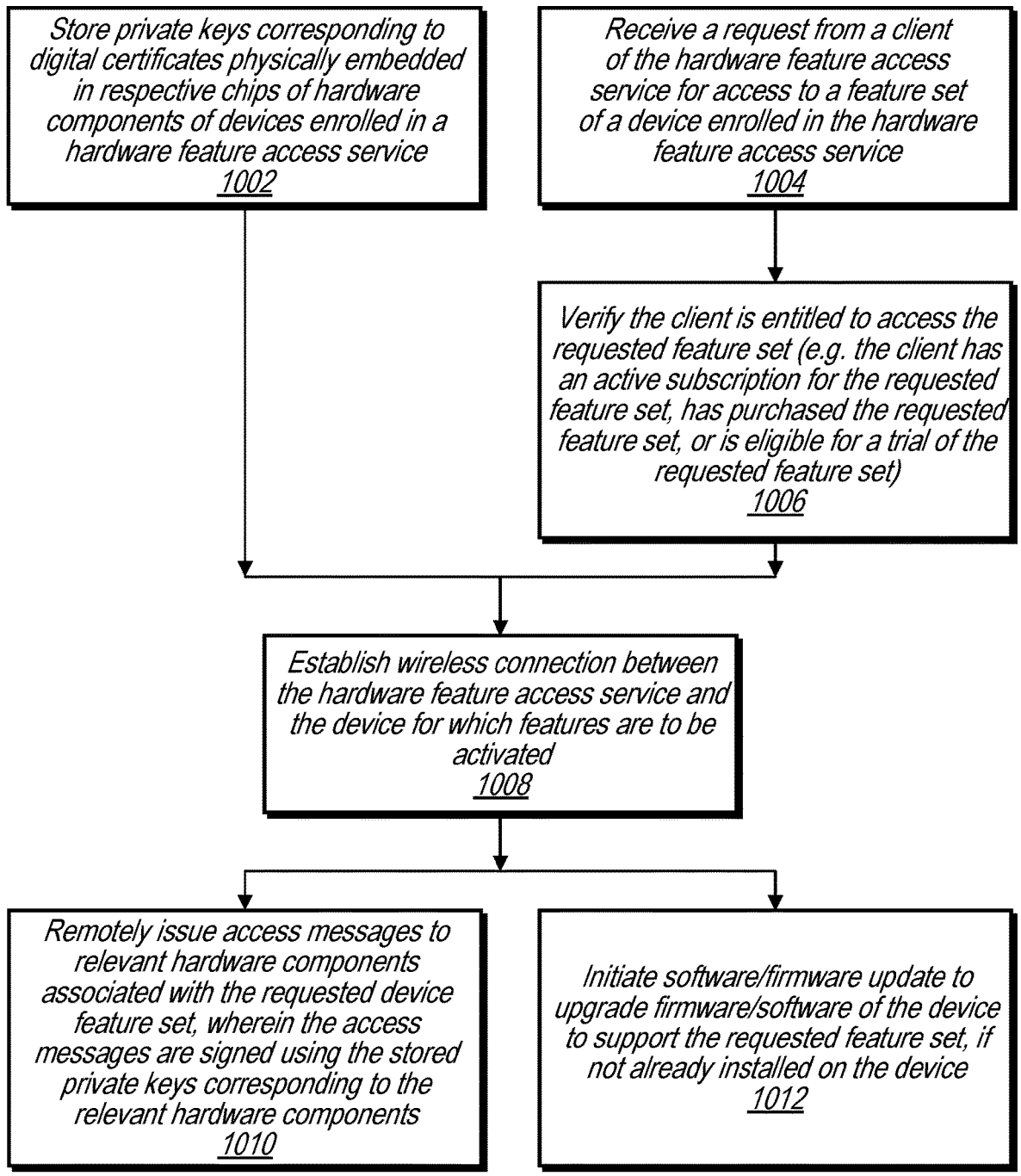
FIG. 10 illustrates a flowchart for remotely enabling hardware feature sets for devices enrolled in a hardware feature access service, according to some embodiments.

FIG. 10 illustrates a flowchart for remotely enabling hardware feature sets for devices enrolled in a hardware feature access service, according to some embodiments.

At 1002, a hardware feature access service stores private keys corresponding to digital certificates physically embedded in, or otherwise loaded in, respective chipsets of hardware components of devices enrolled in the hardware feature access service. In some embodiments, the devices may be vehicles as described above in regard to FIGS. 1-7. In some embodiments, the devices may be devices of shared spaces as described in FIGS. 9A-9C, and in some embodiments, the devices may be other types of devices such as rental devices, consumer electronic devices, etc.

At 1004, the hardware feature access service receives a request from a client of the hardware feature access service, wherein the request requests access to a feature set of a hardware device enrolled in the hardware feature access service.

At 1006, the hardware feature access service verifies the client is entitled to receive access to the requested feature set for the particular device. For example, the hardware feature access service may verify that the client has an active subscription for the requested feature set, verify that the client has purchased the requested feature set, verify the client is eligible for a free-trial of the requested feature set, or verify that the client is otherwise entitled to access the requested feature set.

At 1008, the hardware feature access service establishes a wireless connection between the hardware feature access service and the device for which hardware feature sets are to be enabled. For example, the hardware feature access service may establish the wireless connection via a cellular network, satellite network, a private network, a public network, such as the Internet, or any combination thereof.

At 1010, the hardware feature access service remotely issues access messages to chipsets of relevant hardware components that are relevant to implementing the requested feature set. Each of the access messages is signed with a digital signature that requires knowledge of a private key that was also used to generate a digital certificate embedded in a chip of a chipset to which the access message is directed. The digital signature indicates that the access message is authentically from the hardware feature access service and has not been altered. In response to receiving an access message, each of the chipsets verify the authenticity of the access message using the chipset's digital certificate and in response to verifying the authenticity of the access message, unlock the associated hardware component associated with the given chipset.

At 1012, the hardware feature access service optionally initiates a software/firmware update to upgrade software or firmware of the device to support the requested feature set. Thus the hardware feature access service may both unlock relevant hardware components needed to implement the requested feature set and also provide updated software or firmware to enable the requested feature set.

Figure 11:
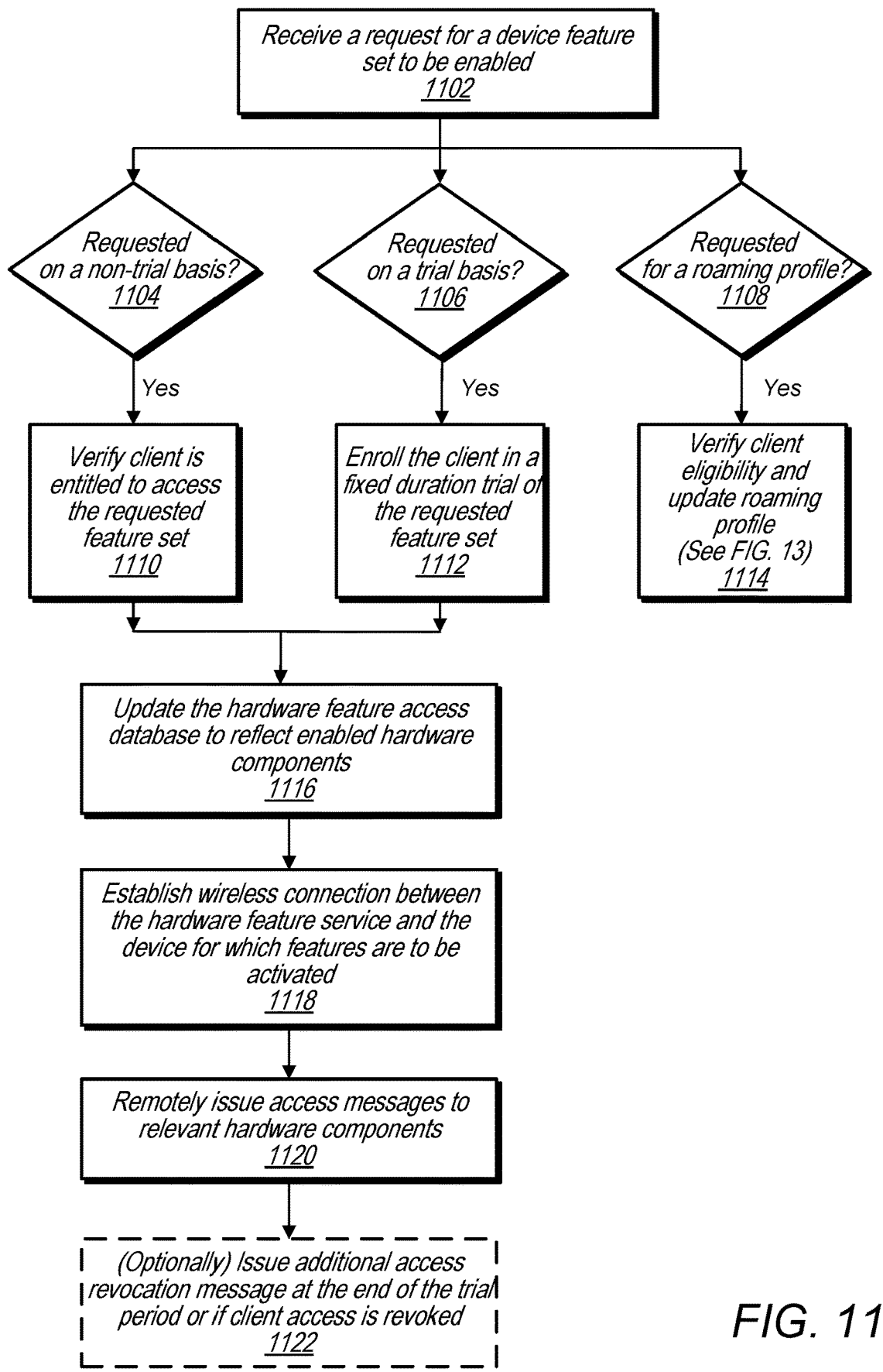
FIG. 11 illustrates a flowchart for providing varying-duration access or varying access types to a client for devices enrolled in a hardware feature access service, according to some embodiments.

FIG. 11 illustrates a flowchart for providing varying-duration access or varying access types to a client for devices enrolled in a hardware feature access service, according to some embodiments.

At 1102, a hardware feature access service receives a request for a device feature set to be enabled. The request may be submitted via an interface page as described in FIG. 4, or via another interface to the hardware feature access service, such as an API, command line interface, etc.

At 1104, 1106, and 1108, the hardware feature access service may determine the terms upon which the requested feature set is to be enabled. For example, at 1104, the hardware feature access service may determine if the requested feature set is to be enabled on a non-trial basis, at 1106 the hardware feature access service may determine if the requested feature set is to be enabled on a trial basis, at 1108 the hardware feature access service may determine if the requested feature set is to be enabled as part of a roaming profile, or the hardware feature access service may determine that the requested feature set is to be enabled according to other terms.

If the requested feature set is to be enabled on a non-trial basis, at 1110 the hardware feature access service verifies the client is entitled to the requested feature set, e.g. the client has purchased the requested feature set, the client has a current subscription that supports the requested feature set, etc.

If the requested feature set is to be enabled on a trial basis, at 1112 the hardware feature access service enrolls the client in a fixed duration trial for the requested feature set. In some embodiments, the hardware feature access service may track which features have been tested on a trial basis by which clients and may limit a quantity of test trials made available to the client.

If the requested feature set is for a roaming profile, at 1114 the hardware feature access service verifies the client has an active roaming profile and updates the roaming profile to include the requested feature set, given the client is entitled to the requested feature set. Roaming profiles are further discussed below in regard to FIG. 13.

At 1116, the hardware feature access service updates a database of the hardware feature access service to reflect relevant hardware components for the requested feature set are enabled.

At 1118, the hardware feature access service establishes a wireless connection between the hardware feature access service and the device for which hardware components are to be unlocked to enable the requested feature set.

At 1120, the hardware feature access service issues access messages to chipsets of the relevant hardware components, via the wireless connection, to unlock the relevant hardware components.

At 1122, the hardware feature access service optionally issues additional access revocation messages to the chipsets of the relevant hardware components. For example subsequent to an expiration of a fixed duration trial period, subsequent to the termination of a subscription, due to a change of ownership of the device, or for other reasons, the hardware feature access service may send revocation messages to cause hardware components no longer enabled to revert to a locked state.

Figure 12:
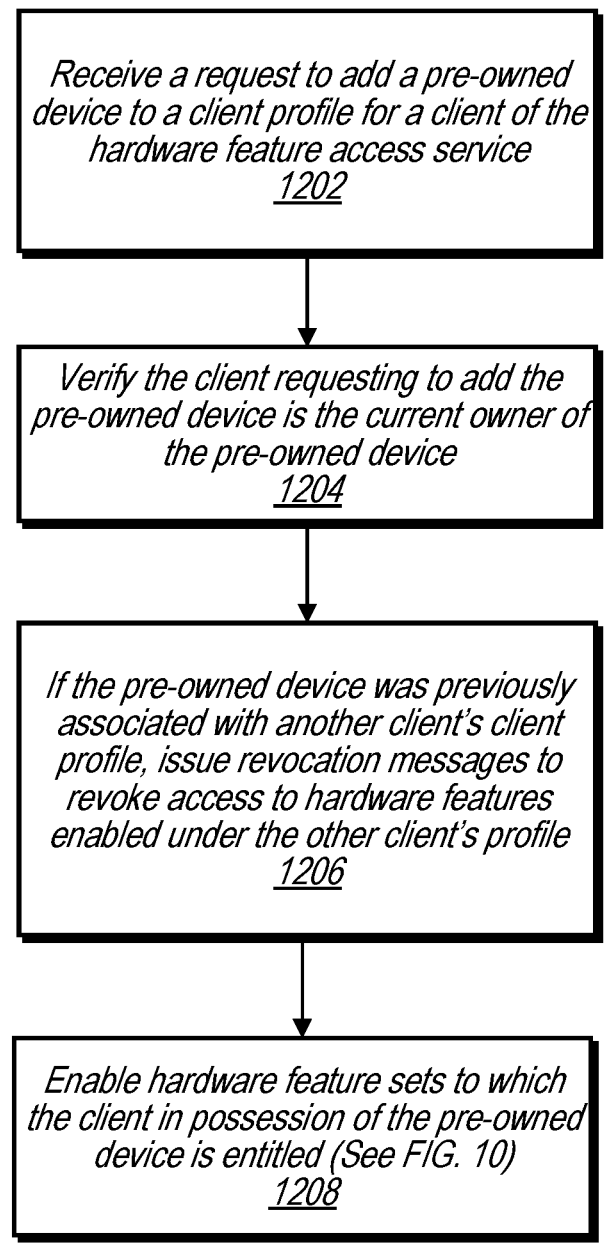
FIG. 12 illustrates a flowchart for enabling a client of a hardware feature access service to manage device features of a pre-owned device, according to some embodiments.

FIG. 12 illustrates a flowchart for enabling a client of a hardware feature access service to manage device features of a pre-owned device, according to some embodiments.

At 1202, a hardware feature access service receives a request to add a pre-owned device to a client profile (e.g. client account) for a client of the hardware feature access service. The pre-owned device may include one or more chipsets with digital certificates that were generated based on private keys known to the hardware feature access service. However, prior to receiving the request, the device (and the private keys for the chipsets of hardware components of the device) may have been associated with another client's profile or not associated with an active client's profile or account.

At 1204, the hardware feature access service may verify the client requesting to add the pre-owned device is a current owner of the pre-owned device or otherwise has authority to manage hardware features for the pre-owned device. For example, in some embodiments a current owner of a device may be able to submit a change of ownership message to the hardware feature access service to change ownership to a subsequent purchaser of the device. In other embodiments, a hardware feature service may verify that there is not another active client profile that lists the device as being an active device for the other client profile, or if there is another active client profile that lists the device, the hardware feature access service may verify with the current owner that the device has been transferred to the requesting client. This may be done before adding the pre-owned device to the requesting client's profile.

At 1206, if the pre-owned device was previously associated with another client's profile or otherwise has unlocked hardware components that are not entitled to be unlocked under the current owner's client profile, the hardware feature access service may issue one or more revocation messages to chipsets associated with the unlocked hardware components to cause the unlocked hardware components to change state to a locked state.

At 1208, the hardware feature access service issues access messages to chipsets of the device newly associated with the current owner's client profile to enable feature sets to which the current owner is entitled. For example, a similar process as described in FIG. 10 may be followed to enable feature sets to which the current owner is entitled.

Figure 13A:
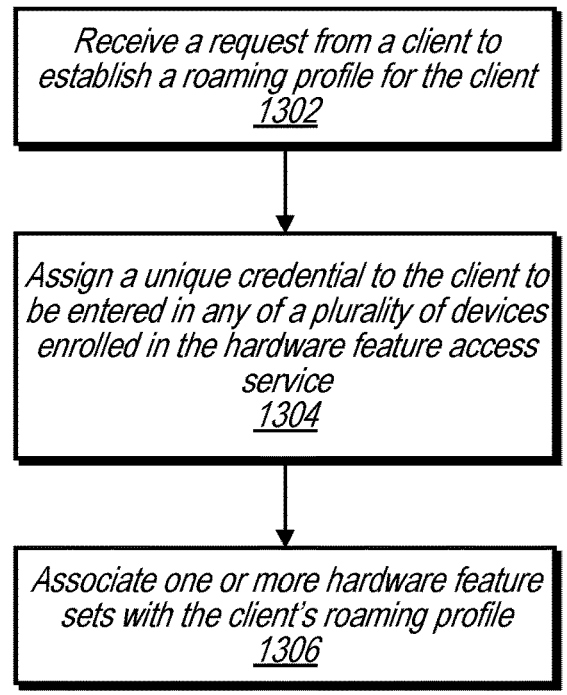
FIG. 13A illustrates a flowchart for establishing a roaming profile for a client of a hardware feature access service, according to some embodiments.

FIG. 13A illustrates a flowchart for establishing a roaming profile for a client of a hardware feature access service, according to some embodiments.

At 1302, the hardware feature access service receives a request from a client to establish a roaming profile for the client. For example, the request may be received via an interface page, such as interface page 600, illustrated in FIG. 6 or via another interface to the hardware feature access service, such as an API, command line interface, etc.

At 1304, the hardware feature access service assigns a unique credential to the client to be entered in an interface of any of a plurality of devices enrolled in the hardware feature access service. For example, the credential may be a username and password, an application to be downloaded to a mobile device, wherein the application causes the mobile device to emit a signal or display a code that uniquely identifies the client. In some embodiments, the credential may be a hardware device, such as a key fob, or other type of hardware device that may be used to uniquely identify the client. The hardware feature access service also associates the issued credential with the client's roaming profile.

At 1306, the hardware feature access service associates one or more feature sets with the client's roaming profile.

Figure 13B:
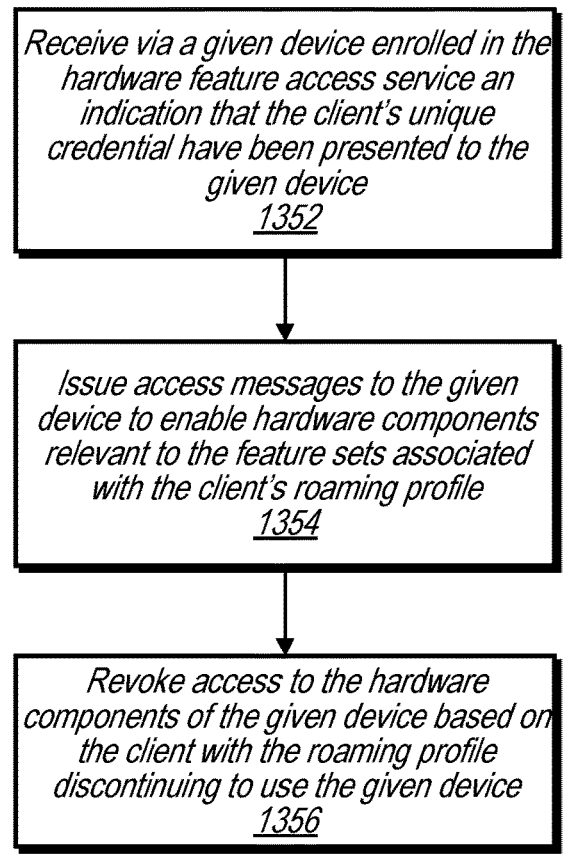
FIG. 13B illustrates a flowchart for providing access to a client with a roaming profile to access hardware components of devices enrolled in a hardware feature access service, according to some embodiments.

FIG. 13B illustrates a flowchart for providing access to a client with a roaming profile to access hardware components of devices enrolled in a hardware feature access service, according to some embodiments.

At 1352, the hardware feature access service receives, via an interface of a given device enrolled in the hardware feature access service, the client's issued credentials. For example, the client may have presented the key fob issued at 1304, or may have entered the username and password issued at 1304, in a particular device, such as vehicle, enrolled in the hardware feature access service.

At 1354, in response to receiving valid credentials, the hardware feature access service issues one or more access messages to chipsets of hardware components of the given device that are relevant to implementing feature sets associated with the client's roaming profile.

At 1356, when the client is no longer using the device, the hardware feature access service issues one or more revocation message to the given device to disable access to the hardware feature sets associated with the client's roaming profile.

Figure 14:
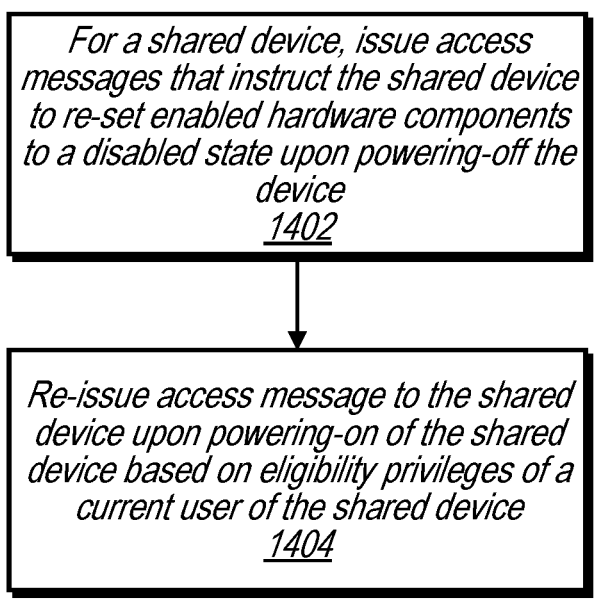
FIG. 14 illustrates a flowchart for managing access to shared devices enrolled in a hardware feature access service, according to some embodiments.

FIG. 14 illustrates a flowchart for managing access to shared devices enrolled in a hardware feature access service, according to some embodiments.

At 1402, for a shared device, the hardware feature access service issues access messages that instruct the shared device to re-set enabled hardware components to a disabled state (e.g. lock the hardware components via their respective chipsets) upon the powering-off of the device.

At 1404, in response to powering-on of the device, the hardware feature access service determines whether a given client is still entitled to a particular set of features, and if so, the hardware feature access service re-issues access messages to the chipsets of the hardware components of the device to re-enable the feature sets to which the client is entitled. In some embodiments, a shared device may request access upon each powering-on event and may revert one or more hard ware components to a locked status upon a powering-off event. In some embodiments, other schema may be used to manage a shared device.

Example Computer System

Figure 15:
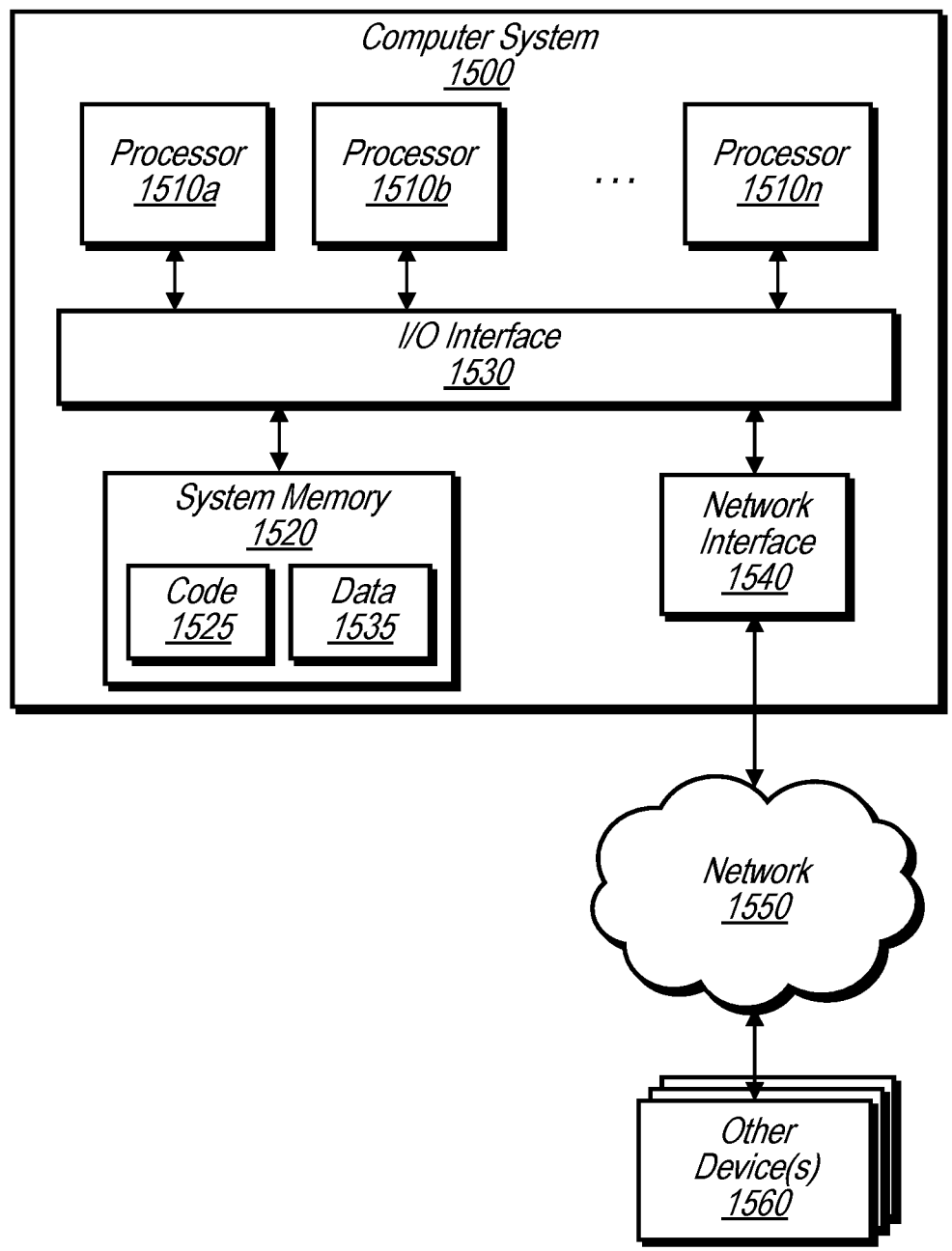
FIG. 15 is a block diagram illustrating an example computer system that implements some or all of the techniques described herein, according to some embodiments.

Any of various computer systems may be configured to implement processes associated with a vehicle feature access service, a device feature access service, a provider network that implement a vehicle or device feature access service, an operating system in a vehicle or device, or any other component of the above figures. For example, FIG. 15 is a block diagram illustrating an example computer system that implements some or all of the techniques described herein, according to some embodiments. In various embodiments, the vehicle feature access service, the device feature access service, the provider network that implement the vehicle or the device feature access service, the operating system in a vehicle or device, or any other component of the above figures FIGS. 1-14 may each include one or more computer systems 1500 such as that illustrated in FIG. 15.

In the illustrated embodiment, computer system 1500 includes one or more processors 1510 coupled to a system memory 1520 via an input/output (I/O) interface 1530. Computer system 1500 further includes a network interface 1540 coupled to I/O interface 1530. In some embodiments, computer system 1500 may be illustrative of servers implementing enterprise logic or downloadable application, while in other embodiments servers may include more, fewer, or different elements than computer system 1500.

In various embodiments, computing device 1500 may be a uniprocessor system including one processor or a multi-processor system including several processors 1510A-1510N (e.g., two, four, eight, or another suitable number). Processors 1510A-1510N may include any suitable processors capable of executing instructions. For example, in various embodiments, processors 1510A-1510N may be processors implementing any of a variety of instruction set architectures (ISAs), such as the x86, PowerPC, SPARC, or MIPS ISAs, or any other suitable ISA. In multiprocessor systems, each of processors 1510A-1510N may commonly, but not necessarily, implement the same ISA.

System memory 1520 may be configured to store program instructions and data accessible by processor(s) 1510A-1510N. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1520 as code (i.e., program instructions) 1525 and data 1526.

In one embodiment, I/O interface 1530 may be configured to coordinate I/O traffic between processors 1510A-1510N, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processors 1510A-1510N.

Network interface 1540 may be configured to allow data to be exchanged between computing device 1500 and other devices 1560 attached to a network or networks 1550. In various embodiments, network interface 1540 may support communication via any suitable wired or wireless general data networks, such as types of Ethernet networks or cellular networks, for example. Additionally, network interface 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of a computer-readable (i.e., computer-accessible) medium configured to store program instructions and data as described above for implementing embodiments of the corresponding methods, systems, and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1500 via I/O interface 1530. One or more non-transitory computer-readable storage media may also include any volatile or non-volatile media such as RAM (e.g. SDRAM, DDR SDRAM, RDRAM, SRAM, etc.), ROM, etc., that may be included in some embodiments of computing device 1500 as system memory 1520 or another type of memory. Further, a computer-readable medium may include transmission media or signals such as electrical, electromagnetic, or digital signals, conveyed via a communication medium such as a network and/or a wireless link, such as may be implemented via network interface 1540. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system for implementing a vehicle feature access service, the system comprising:
    a hardware key depository storing data that corresponds to respective digital certificates embedded in respective chipsets of hardware components included in vehicles enrolled in the vehicle feature access service, wherein the digital certificates are embedded in at least one chip of the respective chipsets of the hardware components at the time of manufacture of the respective chipsets, and wherein each chipset is configured to prevent locking or unlocking of the respective chipset's associated hardware component without being provided an access key corresponding to the digital certificate embedded in the at least one chip of the respective chipset;
    one or more computing devices storing program instructions, that when executed by one or more processors, implement a hardware component communication interface configured to:
        establish a wireless connection to a particular vehicle of the vehicles enrolled in the vehicle feature access service; and
        issue one or more access messages to one or more chipsets of one or more hardware components of the particular vehicle to unlock the one or more hardware components of the particular vehicle, wherein the one or more access messages are signed using the data corresponding to the digital certificates embedded in the respective one or more chipsets of the one or more hardware components of the particular vehicle; and
    one or more computing devices storing program instructions, that when executed by one or more processors, implement a service interface for the vehicle feature access service, wherein the service interface is configured to:
        receive a request from a client of the vehicle feature access service to provide a vehicle feature set for a given vehicle enrolled in the vehicle feature access service;
        verify the client is entitled to be provided the requested vehicle feature set for the given vehicle; and
        cause the hardware component communication interface to remotely issue one or more access messages to one or more chipsets associated with relevant hardware components of the given vehicle associated with the requested vehicle feature set to unlock the one or more relevant hardware components and enable the requested vehicle feature set for the given vehicle.

2. The system of claim 1, wherein the service interface is further configured to:
    receive a request from the client for access to another vehicle feature set for a fixed duration trial period;
    enroll the client in a fixed duration trial for the other vehicle feature set; and
    cause the hardware component interface to remotely issue one or more access messages to one or more chipsets of one or more relevant hardware components associated with the other vehicle feature set to unlock the one or more relevant hardware components associated with the other vehicle feature set for the fixed duration trial period.

3. The system of claim 2, wherein the one or more access messages for the fixed duration trial period indicate a duration of the fixed duration trial period, and wherein the one or more chipsets of the one or more relevant hardware components are configured to revert to a locked state at the expiration of the fixed duration trial period.

4. The system of claim 2, wherein the hardware component communication interface is configured to:
    send one or more additional messages, subsequent to the fixed duration time period, indicating that the access for the one or more relevant hardware components associated with the other vehicle feature set has been revoked.

5. The system of claim 1, wherein the service interface is further configured to:
    receive a request from the client to enroll the given vehicle in an account of the client with the vehicle feature access service;
    verify the client is a current owner of the given vehicle referenced in the request to enroll the given vehicle, wherein the given vehicle was previously owned by someone or some entity other than the client; and
    in response to verifying the client is the current owner of the given vehicle, grant the client privileges to request modification of vehicle feature sets enabled for the given vehicle.

6. The system of claim 1, wherein the service interface is further configured to:
    receive a request from the client to establish a roaming driver profile for the client;
    verify the client is entitled to be provided the roaming driver profile; and
    assign a unique credential to the client to be presented in any of a plurality of vehicles enrolled in the vehicle feature access service to enable a group of one or more vehicle feature sets associated with the roaming driver profile;
wherein the hardware component communication interface is further configured to:
    receive, via a given particular vehicle of the plurality of vehicles enrolled in the vehicle feature access service, an indication that the client's unique credentials have been presented to the given particular vehicle; and
    issue one or more access messages to one or more chipsets of one or more hardware components of the given particular vehicle to unlock one or more hardware components corresponding to the group of one or more vehicle feature sets associated with the client's roaming driver profile.

7. A hardware feature access service, comprising:
a hardware key depository storing data that corresponds to respective digital certificates embedded in respective chipsets of hardware components included in devices enrolled in the hardware feature access service, wherein the digital certificates are embedded in at least one chip of each of the respective chipsets of the hardware components at the time of manufacture of the respective at least one chips, and wherein each chipset is configured to prevent locking or unlocking of the respective chipset's associated hardware component without being provided an access key corresponding to the digital certificate embedded in the at least one chip of the respective chipset;
one or more computing devices storing program instructions, that when executed by one or more processors, implement a hardware component communication interface configured to:
remotely issue one or more access messages to one or more chipsets of one or more hardware components of devices enrolled in the hardware feature access service to unlock the hardware components, wherein the one or more access messages are signed using the data corresponding to the digital certificates embedded in the at least one chip of the respective chipsets of the hardware components; and
one or more computing devices storing program instructions, that when executed by one or more processors, implement a service interface configured to:
receive a request from a client of the hardware feature access service to provide a device feature set for a given device enrolled in the hardware feature access service; and
cause the hardware component communication interface to remotely issue one or more access messages to one or more chipsets of one or more relevant hardware components associated with the device feature set to unlock the one or more relevant hardware components and enable the device feature set.

8. The hardware feature access service of claim 7, wherein at least some of the devices enrolled in the hardware feature access service comprise equipment installed in a shared resource enrolled in the hardware feature access service,
wherein the request from the client to provide the device feature set for the given device is included in, or generated from, a request for access to a particular shared resource comprising equipment enrolled in the hardware feature access service, and
wherein the service interface is configured to:
cause the hardware communications interface to remotely issue one or more access messages to one or more chipsets of the hardware components of at least a subset of the equipment of the particular shared resource to enable the client to use the subset of equipment of the particular shared resource for a duration of the reservation.

9. The hardware feature access service of claim 7, wherein at least some of the devices enrolled in the hardware feature access service are included in vehicles enrolled in the hardware feature access service.

10. The hardware feature access service of claim 9, wherein at least some of the vehicles enrolled in the hardware feature access service are configured such that chipsets of the relevant hardware components associated with the device feature set revert to a locked-state when the vehicle is powered-off,
wherein the service interface is further configured to:
cause the hardware component communication interface to remotely re-issue one or more access messages when the vehicle is powered-on, based, at least in part, on verifying the client continues to be entitled to be provided the device feature set.

11. The hardware feature access service of claim 7, wherein the service interface is further configured to:
initiate a firmware update for one or more of the relevant hardware components that are being unlocked via the one or more access messages.

12. The hardware feature access service of claim 7, wherein the digital certificates physically embedded in the at least one chip of each of the respective chipsets of the hardware components are generated using an asymmetrical encryption technique,
wherein each of the digital certificates comprises a unique public key, and wherein the one or more access messages are signed using unique private keys corresponding to the unique public keys included in the digital certificates.

13. The hardware feature access service of claim 7, wherein the service interface is further configured to:
receive a request from the client to establish a roaming profile for the client; and
assign a unique credential to the client to be entered in any of a plurality of devices enrolled in the hardware feature access service to enable a group of one or more device feature sets associated with the client to be enabled in any of a plurality of devices enrolled in the hardware feature access service;
wherein the hardware component communication interface is further configured to:
receive, via a given particular device of the plurality of devices enrolled in the hardware feature access service, an indication that the client's unique credentials have been presented to the given particular device; and
issue one or more access messages to one or more chipsets of one or more hardware components of the given particular device to unlock the one or more hardware components corresponding to the group of device feature sets associated with the client's roaming profile.

14. The hardware feature access service of claim 7, wherein the service interface is configured to:
receive a request from the client or another client of the hardware feature access service requesting access to another device feature set for a fixed duration trial period;
enroll the client or the other client in a fixed duration trial for the other device feature set; and
cause the hardware component interface to remotely issue one or more access messages to one or more chipsets of one or more hardware components associated with the other device feature set to enable the other device feature set for the fixed duration trial period.

15. A method comprising:
storing, by a hardware feature access service, private keys corresponding to digital certificates embedded in chipsets associated to respective hardware components included in devices enrolled in the hardware feature access service, wherein each chipset is configured to prevent locking or unlocking of the respective chipset's associated hardware component without first being provided an access key to an access processor of the respective chipset generated from one of the respective private keys corresponding to the digital certificate embedded in the respective chipset;

receiving, at the hardware feature access service, a request from a client of the hardware feature access service to provide a device feature set for a given device enrolled in the hardware feature access service; and remotely issuing one or more access messages pertaining to the requested device feature set to one or more respective access processors of respective chipsets associated to respective hardware components to unlock the respective hardware components and enable the device feature set in the given device enrolled in the hardware feature access service.

16. The method of claim 15, wherein the request from the client to provide the device feature set for the given device indicates a fixed duration trial period, and wherein the remotely issued one or more access messages indicate that the relevant hardware components are to be disabled at the completion of the fixed duration trial period.

17. The method of claim 15, wherein the given device was previously owned by another client of the hardware feature access service, the method further comprising:

verifying the client is a current owner of the given device referenced in the request;

issuing one or more revocation messages pertaining to a device feature set subscribed to by another client who previously owned the given device to one or more respective access processors of respective chipsets associated to respective hardware components; and subsequent to issuing the revocation messages, performing said issuing the one or more access messages pertaining to the device feature set requested by the client who is the current owner of the device to the one or more respective access processors of the respective chipsets associated to the respective hardware components.

18. The method of claim 15, further comprising:

receiving a request from the client to establish a roaming profile for the client; and assigning a unique credential to the client to be entered in any one of a plurality of devices enrolled in the hardware feature access service to enable a group of one or more device feature sets, associated with the roaming profile, to be enabled in the one of the devices enrolled in the hardware feature access service.

19. The method of claim 15, further comprising:

determining the client is no longer entitled to access the device feature set for the given device; and issuing one or more revocation messages to one or more respective access processors of the respective chipsets of the given device, wherein in response to the one or more revocation messages the one or more chipsets lock hardware components indicated to have revoked access in the one or more revocation messages.

20. The method of claim 15, wherein the digital certificates embedded in the chipsets associated to the respective hardware components are generated using an asymmetrical encryption technique, and wherein the one or more access messages are signed using unique private keys corresponding to unique public keys associated with the digital certificates.

* * * * *